(12) United States Patent
Rogers et al.

(10) Patent No.: US 12,467,747 B2
(45) Date of Patent: Nov. 11, 2025

(54) WHEEL ALIGNER WITH IMPROVED ACCURACY AND NO-STOP POSITIONING USING A DRIVE DIRECTION CALCULATION

(71) Applicant: Snap-On Incorporated, Kenosha, WI (US)

(72) Inventors: Steven W. Rogers, Conway, AR (US); David A. Jackson, Point Roberts, WA (US); Eric R. Sellers, Conway, AR (US); Ronald D. Swayne, Sherwood, AR (US); James Rodney Harrell, Greenbrier, AR (US); Chance Robinson, North Little Rock, AR (US); Robert J. D'Agostino, Conway, AR (US); Adam C. Brown, Maumelle, AR (US)

(73) Assignee: Snap-On Incorporated, Kenosha, WI (US)

( * ) Notice: Subject to any disclaimer, the term of this patent is extended or adjusted under 35 U.S.C. 154(b) by 278 days.

(21) Appl. No.: 18/184,338

(22) Filed: Mar. 15, 2023

(65) Prior Publication Data

US 2023/0213333 A1    Jul. 6, 2023

Related U.S. Application Data

(62) Division of application No. 16/570,583, filed on Sep. 13, 2019, now Pat. No. 11,698,250.

(Continued)

(51) Int. Cl.
    *G01B 11/27*    (2006.01)
    *B60W 40/10*    (2012.01)
    (Continued)

(52) U.S. Cl.
    CPC ......... *G01B 11/2755* (2013.01); *B60W 40/10* (2013.01); *G06T 7/60* (2013.01);
    (Continued)

(58) Field of Classification Search
    CPC ...................................................... H04N 23/54
    See application file for complete search history.

(56) References Cited

U.S. PATENT DOCUMENTS

| 5,535,522 A | 7/1996 | Jackson |
| 5,724,743 A | 3/1998 | Jackson |

(Continued)

FOREIGN PATENT DOCUMENTS

| CN | 1427945 A | 7/2003 |
| CN | 1447903 A | 10/2003 |

(Continued)

OTHER PUBLICATIONS

An Office Action issued by the European Patent Office on Mar. 21, 2023, which corresponds to European Patent Application 16854347.8 and is related to U.S. Appl. No. 16/570,583.

(Continued)

*Primary Examiner* — Mary Cheung
(74) *Attorney, Agent, or Firm* — Studebaker Brackett PLLC

(57) ABSTRACT

Vehicle alignment systems and methods are disclosed which operate based on a calculation of "drive direction," or the direction in which a vehicle is moving. Since a vehicle can be assumed to be a rigid body, each wheel has the same drive direction. Consequently, an alignment parameter of one wheel can be compared to the same parameter of another wheel by equating their drive direction, eliminating the need for the aligner to "see" both sides of the vehicle at the same time. Embodiments include a system having one or more cameras on a fixture carrying a calibration element for an (Continued)

ADAS system, and one or more targets placed on the vehicle to measure the drive direction of the vehicle. The drive direction is assumed to be parallel to the vehicle thrust line and can be used as the line for orientation of the fixture to the vehicle.

12 Claims, 17 Drawing Sheets

Related U.S. Application Data

(60) Provisional application No. 62/730,727, filed on Sep. 13, 2018.

(51) Int. Cl.
| | | |
|---|---|---|
| G01B 11/275 | (2006.01) | |
| G06T 7/60 | (2017.01) | |
| G06T 7/70 | (2017.01) | |
| H04N 23/54 | (2023.01) | |
| B60W 40/13 | (2012.01) | |

(52) U.S. Cl.
CPC ............... *G06T 7/70* (2017.01); *H04N 23/54* (2023.01); *B60W 40/13* (2013.01); *G01B 2210/12* (2013.01); *G01B 2210/143* (2013.01); *G01B 2210/16* (2013.01); *G01B 2210/303* (2013.01); *G06T 2200/24* (2013.01); *G06T 2207/30252* (2013.01)

(56) References Cited

U.S. PATENT DOCUMENTS

| | | | |
|---|---|---|---|
| 5,969,246 A | 10/1999 | Jackson et al. | |
| 6,237,234 B1 | 5/2001 | Jackson et al. | |
| 6,427,346 B1 | 8/2002 | Stieff et al. | |
| 6,658,751 B2 | 12/2003 | Jackson et al. | |
| 6,823,601 B2 | 11/2004 | Murray | |
| 6,931,340 B2 | 8/2005 | Jackson et al. | |
| 6,959,253 B2 | 10/2005 | Jackson et al. | |
| 6,968,282 B1 | 11/2005 | Jackson et al. | |
| 7,040,029 B1 | 5/2006 | Hillman et al. | |
| 7,062,861 B2 | 6/2006 | O'Mahony et al. | |
| 7,069,660 B2 | 7/2006 | Robb et al. | |
| 7,121,011 B2 | 10/2006 | Murray et al. | |
| 7,164,472 B2 | 1/2007 | Dorrance et al. | |
| 7,313,869 B1 | 1/2008 | Rogers | |
| 7,424,387 B1 * | 9/2008 | Gill | G01B 11/272 |
| | | | 33/288 |
| 8,522,609 B2 | 9/2013 | Nobis et al. | |
| 8,836,764 B2 | 9/2014 | Gruetzmann et al. | |
| 9,982,998 B2 | 5/2018 | D'Agostino et al. | |
| 10,072,926 B2 | 9/2018 | Rogers et al. | |
| 11,830,221 B2 | 11/2023 | Corghi | |
| 2002/0027651 A1 | 3/2002 | Jackson et al. | |
| 2002/0080343 A1 | 6/2002 | Bux et al. | |
| 2003/0051356 A1 | 3/2003 | Jackson et al. | |
| 2005/0027473 A1 | 2/2005 | Davidson et al. | |
| 2005/0096807 A1 | 5/2005 | Murray et al. | |
| 2006/0085111 A1 | 4/2006 | Kojima | |
| 2006/0164295 A1 | 7/2006 | Focke et al. | |
| 2006/0184296 A1 * | 8/2006 | Voeller | G01B 11/275 |
| | | | 701/31.4 |
| 2007/0124949 A1 * | 6/2007 | Burns | G01B 11/2545 |
| | | | 33/288 |
| 2009/0031782 A1 * | 2/2009 | Jackson | G01B 11/2755 |
| | | | 33/288 |
| 2010/0238291 A1 | 9/2010 | Pavlov et al. | |
| 2011/0077800 A1 | 3/2011 | Palmer et al. | |
| 2011/0100107 A1 | 5/2011 | Nobis et al. | |
| 2013/0307967 A1 | 11/2013 | D'Agostino et al. | |
| 2014/0002638 A1 * | 1/2014 | Cerruti | G01B 11/2755 |
| | | | 348/135 |
| 2014/0219509 A1 | 8/2014 | Buzzi et al. | |
| 2014/0253909 A1 * | 9/2014 | McClenahan | G01B 11/2755 |
| | | | 356/139.09 |
| 2016/0195388 A1 * | 7/2016 | D'Agostino | G01B 11/2755 |
| | | | 33/228 |
| 2017/0097229 A1 | 4/2017 | Rogers et al. | |
| 2020/0088515 A1 | 3/2020 | Rogers et al. | |

FOREIGN PATENT DOCUMENTS

| | | |
|---|---|---|
| CN | 1464970 A | 12/2003 |
| CN | 1826508 A | 8/2006 |
| CN | 1908612 A | 2/2007 |
| CN | 101568798 A | 10/2009 |
| CN | 101707890 A | 5/2010 |
| CN | 104380038 A | 2/2015 |
| DE | 44 19 584 A1 | 12/1995 |
| EP | 0971205 B1 | 2/2007 |
| EP | 2329220 B1 | 12/2012 |
| EP | 1953520 B1 | 3/2016 |
| EP | 3655796 B1 | 10/2021 |
| WO | 2013/163643 A1 | 10/2013 |

OTHER PUBLICATIONS

International Preliminary Report on Patentability and Written Opinion issued in PCT/US2019/051071 issued on Mar. 9, 2021.
International Search Report and Written Opinion issued in PCT/US2021/037347; mailed Sep. 17, 2021.
The partial supplementary European search report (R. 164 EPC) issued by the European Patent Office on May 3, 2022, which corresponds to European Patent Application No. 19860163.5-1001 and is related to U.S. Appl. No. 16/570,583.
Bosch Sensortec; "BNO055; data sheet; Intelligent 9-axis absolute orientation sensor"; Document Revision 1.6; Feb. 2020; total 8 pages; https://datasheetspdf.com/pdf-file/848780/Bosch/BNO055/1.
International Search Report and Written Opinion issued in PCT/US22/14939; mailed May 5, 2022.
The extended European search report issued by the European Patent Office on Aug. 19, 2022, which corresponds to European Patent Application No. 19860163.5-1001 and is related to U.S. Appl. No. 16/570,583.
An Office Action issued by the Chinese National Intellectual Property Administration on Nov. 2, 2022, which corresponds to Chinese Patent Application No. 202110494343.8 and is related to U.S. Appl. No. 16/570,583.
International Preliminary Report on Patentability issued in PCT/US2021/037347; issued Dec. 13, 2022.
Search Report and Written Opinion mailed Jan. 13, 2020 in International Application No. PCT/US2019/051071.

\* cited by examiner

WHEEL ALIGNER WITH IMPROVED ACCURACY AND NO-STOP POSITIONING USING A DRIVE DIRECTION CALCULATION

RELATED APPLICATIONS

This application is a divisional application of U.S. patent application Ser. No. 16/570,583 filed on Sep. 13, 2019, which claims priority from U.S. Provisional Application No. 62/730,727, filed Sep. 13, 2018, entitled "Wheel Aligner With Improved Accuracy and No-Stop Positioning Using a Drive Direction Calculation," which is hereby incorporated by reference in its entirety.

FIELD

The present subject matter relates to automotive aligners of the machine vision type. The present disclosure has particular applicability to wheel aligners for cars and trucks, and aligners for calibrating various vehicle sensors.

BACKGROUND

Machine vision vehicle alignment systems using movable cameras and targets attached to vehicle wheels, also known as "image aligners," are well known. The targets are viewed by the cameras such that image data obtained for a prescribed alignment process can be used to calculate vehicle alignment angles for display through a user interface, usually a computer monitor. Early system implementations included rigid beams that connected the cameras so that their position and orientation with respect to each other could be determined and be relied upon as unchanging. Later system implementations were introduced comprising the use of cameras not rigidly connected to each other, but using a separate camera/target system to continuously calibrate the position of one target viewing camera to another. This type of system is described in U.S. Pat. Nos. 5,535,522; 6,931,340; 6,959,253; and 6,968,282, all of which are hereby incorporated by reference herein in their entirety. An example of a vehicle wheel aligner using such image processing is the Visualiner 3D or "V3D", commercially available from John Bean Company, Conway, Ark., a division of Snap-on Incorporated.

There is a need for an aligner to incorporate cameras that can take measurements fast enough and continuously to measure, detect, and correct or warn of a problem with the alignment measurement. Further, there is a need for an aligner that measures, detects or corrects all possible issues that might make the alignment readings incorrect. Moreover, current camera based aligners require a positioning or runout procedure to measure the wheel axis (also referred to as "wheel spindle" or "axis of rotation"), and a steering swing procedure to measure the caster and steering axis inclination (SAI). This procedure is time consuming and frequently requires the technician to hold the vehicle steady at certain points of the positioning and caster swing. There is a need for a faster positioning procedure and a faster caster swing procedure, where the technician can perform the procedure without stops or delays.

A camera based system that addresses these needs is disclosed in U.S. Pat. No. 10,072,926, which is attached hereto and hereby incorporated by reference herein in its entirety. In this system, described in the '926 patent at col. 9, line 38 et seq., image data of the target is captured as the wheel and target are continuously rotated a number of degrees of rotation without a pause. The image data is used to calculate at least one pose of the target for every five degrees of rotation as the wheel and target are continuously rotated. At least one of the cameras comprises a data processor for performing the steps of preprocessing the image data, and calculating an alignment parameter for the vehicle based on the preprocessed image data. Thus, alignment related measurements are taken quickly and continuously.

These conventional camera based aligners require the left and the right side cameras to be rigidly mounted to a beam and their relative location needs to be known. Other types of conventional camera based aligners use an additional camera to look between the measurement cameras (i.e., across the vehicle) at a target to relate the relative positions of the measurement cameras. All of these aligners require either expensive components, or have structures that can get in the way, or both. Thus, there is a desire for an aligner that does not require extra hardware to calibrate the relative camera to camera positions, and/or one that does not require a rigid beam between the two cameras to free up space for the shop and the technician.

The systems of the '926 patent provide great improvements in speed, convenience, accuracy, and functionality over conventional machine vision aligners. However, these systems may be less than ideal for aligning the wheels of certain vehicles such as large trucks and other heavy equipment, due to the size of the vehicles and the consequent geometry between the system's wheel-mounted targets, the system's cameras, and the amount of wheel rotation needed. There is a need for an aligner to quickly and easily measure a large vehicle, ideally as it is driven through a small space.

Advanced driver assistance systems (ADAS) in vehicles aid the driver and provide an additional level of vehicle safety. This includes systems like adaptive cruise control, lane departure warning, collision avoidance, and rear collision warning. These systems use a combination of sensors like cameras, sonar, and radar that may require calibration to operate correctly. Calibration is performed by placing elements such as reflectors, mirrors, targets, etc. in a known relationship to the vehicle. Conventional systems exist that perform vehicle/carrier stand orientation using simple manual measurement by drawing a grid on the floor or lining up elements using a laser line. Systems also exist that use a computerized wheel alignment system with elements placed on the carrier stands to orient and position the calibration elements in relation to the vehicle. Using a wheel alignment system has many advantages. Nevertheless, it is desirable to create a lower-cost, simpler system that does not require a full wheel alignment system, while still providing a guided operation to the user to direct the location and orientation of the carrier stand and measure and document the location of the calibration elements.

SUMMARY OF THE DISCLOSURE

The present disclosure provides a vehicle alignment system comprising a first image sensor for viewing a first target disposed on a first wheel of the vehicle on a first side of the vehicle, and for capturing image data of the first target as the vehicle is rolled and the first wheel and target are rotated; and a second image sensor for viewing a second target disposed on a second wheel of the vehicle on a second side of the vehicle opposite the first side of the vehicle, and for capturing image data of the second target as the vehicle is rolled and the second wheel and target are rotated. A first gravity sensor is attached to the first image sensor, for measuring a sensed orientation relative to gravity on the first side of the vehicle; and a second gravity sensor attached to the second image sensor, for measuring a sensed orientation relative to gravity on the second side of the vehicle. A data processor is provided for performing the steps of: calculating, using the image data, a plural number of poses of each of the first and second targets as the first and second wheels and targets are rotated; calculating a drive direction of the first side of the vehicle using the calculated poses of the first target, and a drive direction of the second side of the vehicle using the calculated poses of the second target; calculating a gravity direction on the first side of the vehicle using the measured orientation relative to gravity of the first gravity sensor, and a gravity direction of the second side of the vehicle using the measured orientation relative to gravity of the second gravity sensor; calculating a vehicle drive direction by transforming the drive direction and gravity direction of the first side of the vehicle into a common coordinate system with the drive direction and gravity direction of the second side of the vehicle; and calculating a wheel alignment parameter using the vehicle drive direction.

According to an aspect of the disclosure, third and fourth targets are attached to third and fourth wheels of the vehicle, and the image sensors capture image data for all four targets. The data processor is for calculating the drive direction of the first side of the vehicle using the calculated poses of the first and third targets, and the drive direction of the second side of the vehicle using the calculated poses of the second and fourth targets.

According a further aspect of the disclosure, the first and second image sensors are mounted to a fixture for carrying an ADAS calibration element, an orientation between the image sensors and the ADAS calibration element is known, and the fixture is located in front of the vehicle. The data processor is for guiding a user to orient the ADAS calibration element to the vehicle drive direction using a user interface Objects and advantages of embodiments of the disclosed subject matter will become apparent from the following description when considered in conjunction with the accompanying drawings. Additionally the different configurations discussed in the sections below may be performed in a different order or simultaneously with each other.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Drive Direction Principles of Operation

The disclosed alignment systems and methods operate based on a calculation of a parameter called "drive direction," which is the direction in which a vehicle is moving. Since a vehicle can be assumed to be a rigid body, each wheel (and each axle) has the same drive direction. Consequently, an alignment parameter of one wheel or one axle can be compared to the same parameter of another wheel or axle by equating their drive direction. For example, each axle's toe can be compared to each other axle's toe by equating each axle's drive direction. Therefore, the relative toe of two axles can be measured (i.e., the axle scrub), without all the cameras of a typical visual aligner seeing both axles at the same time, or without wheel position or orientation information from one side of the vehicle to the other.

A basic concept of drive direction alignment is to measure geometric properties of interest for wheel alignment without directly measuring lateral (i.e., "left to right") position or orientation information about system components. Rather, the disclosed aligners indirectly measure information that couples measurements from left and right sides, allowing measurements from one side of the vehicle to be transformed into a common coordinate system with measurements from the other side of the vehicle. This can be accomplished by measuring two or more directions in common from both sides of the vehicle.

This basic principle will be explained with reference to FIGS. 1A-B. In the illustrated embodiment, the two common directions measured on both the left and right sides of the vehicle 30 are the drive direction and the gravity direction. Drive direction DDL, DDR is measured from a calibrated camera 10L, 10R on each side of the vehicle 30, and gravity direction GDL, GDR is measured from a calibrated inclinometer 102L, 102R rigidly coupled to each camera 10L, 10R. Alternatively, the inclinometers 102L, 102R could be coupled to any stationary target. The transformation of each inclinometer measurement to its coupled camera is known from a prior calibration, which is described herein below.

Measurement of Gravity Direction

Figure 1A:
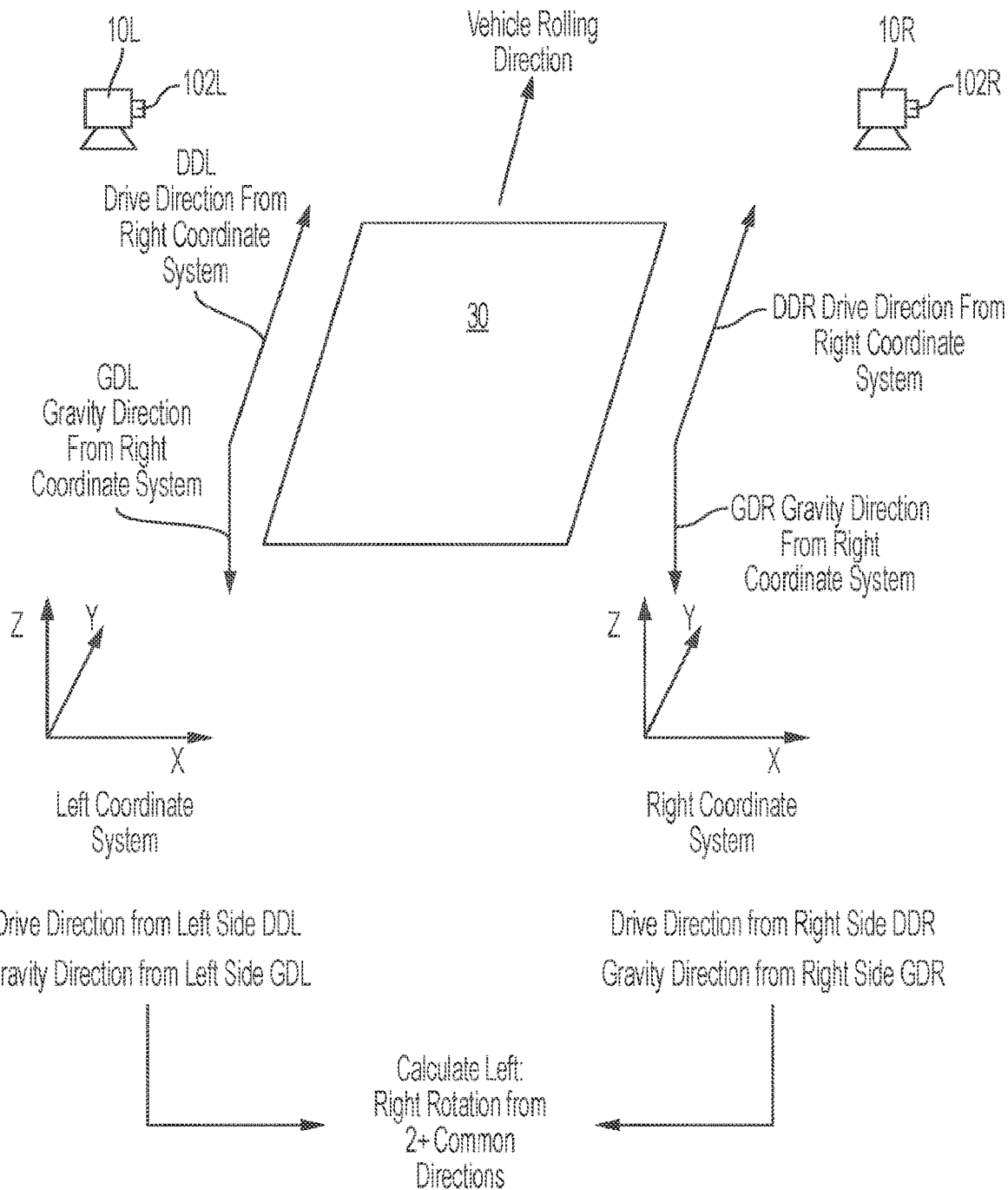
FIG. 1A is a diagram showing drive direction principles of operation according to the present disclosure.
Figure 1B:
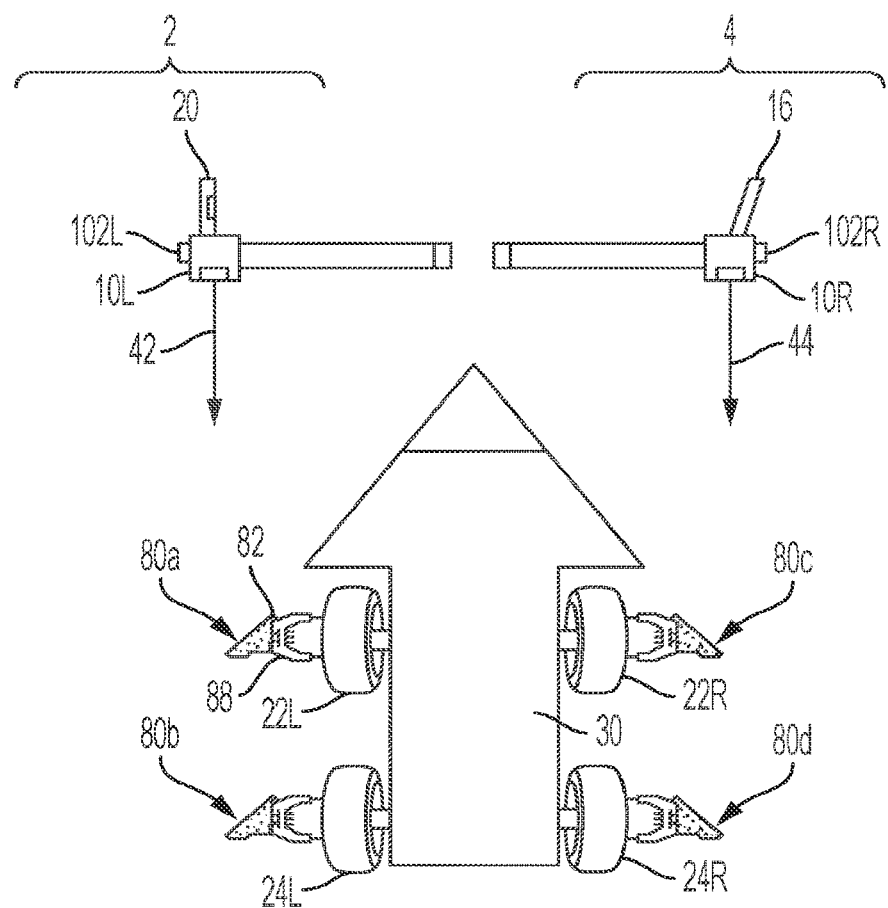
FIG. 1B is a schematic plan view of a vehicle wheel aligner according to an embodiment of the present disclosure.

In the embodiment depicted in FIG. 1A-B, gravity is measured by each inclinometer 102L, 102R in the left and right sides of the vehicle 30. Depending on the type of inclinometer used, those of skill in the art will understand that the measured output may be in the format of a 3D vector expressing the direction of gravity in the inclinometer coordinate system, or it may be expressed as a set of ($\theta X$, $\theta Y$) rotation angles that describe the inclination about the (X, Y) axes of the inclinometer. If the output is a 3D vector describing the gravity vector in the inclinometer coordinate system, it can be directly used in the processing chain.

If the output format is a set of ($\theta X$, $\theta Y$) inclination angles, these angles must be converted to a 3D gravity vector to be used in the processing chain described above. This can be accomplished in a variety of ways. In one embodiment, an initial vector denoting the orientation of gravity in the inclinometer coordinate system is encoded as a 3D vector X=0, Y=0, Z=1. This 3D vector is then made to rotate about the inclinometer X axis by the rotation angle $\theta X$. The rotated 3D vector is then rotated about the inclinometer Y axis by the rotation angle $\theta Y$. This rotated 3D vector now describes the orientation of gravity in the inclinometer coordinate system, given that the inclinometer sits at an inclination of ($\theta X$, $\theta Y$), and can be used in the described processing chain.

The above discussion assumes that a three dimensional wheel alignment procedure is performed. The novelty of the present disclosure is not, however, restricted to purely 3D alignments. It may be desirable to perform 2D alignment measurements. In such a scenario, gravity is measured not as a 3D vector or as a set of 2D angles, but as an elevation angle from a single axis sensor. Under such a configuration, it is assumed that all tilt between cameras is in the vehicle camber direction. The measured inclination angles on both sides of the vehicle are then used to adjust the relative left to right tilt angles of cameras on both sides of the vehicle. This relative tilt angle between the sides of the vehicle is then used as an offset to measure camber angles on both sides of the vehicle to a common reference. Deviations of drive direction measurements from both cameras in the camber direction are ignored.

Transformation of Gravity Directions from Inclinometer to Camera Coordinate System On both sides of the vehicle 30 we must express gravity direction and drive direction in a common coordinate system. This means that geometric quantities measured in one coordinate system must be transformed to the same coordinate basis so that they can be used in downstream calculations. In the system depicted in FIGS. 1A-B, this is accomplished by transforming the measured gravity direction GDL, GDR from each inclinometer coordinate system to its rigidly coupled camera coordinate system. This well-known transformation requires a calibration which quantifies how measurements from the inclinometer coordinate system are transformed to the camera coordinate system. The calibration describes how to rotate from the inclinometer coordinate system to the camera coordinate system. At run-time, the measured 3D gravity vector in each inclinometer coordinate system is multiplied by the inclinometer to camera coordinate system rotation matrix. The net effect is that the gravity, measured in the inclinometer coordinate system, is now expressed in the camera coordinate system on each side of the vehicle.

Measurement of Vehicle Drive Direction

In the embodiment depicted in FIGS. 1A-B, drive direction DDL, DDR is measured on each side of the vehicle with respective camera 10L, 10R. Cameras can be used in a variety of ways to measure drive direction, but in the system depicted in FIGS. 1A-B a set of targets are attached to the vehicle wheels. This is shown, for example, in FIG. 1B, illustrating targets 80a-d attached to vehicle wheels 22L, 22R, 24L, 24R. The conventional targets consist of a set of fiducials of known geometry. The fiducials are identified and localized in a series of camera images as the vehicle rolls through a minimum distance. At each image where the target is visible, the 3D position of the target is calculated in each camera coordinate system in a process well-known to those skilled in the art as monocular pose estimation.

Upon completion of the rolling motion, the measured 3D locations of the targets at all positions are used to calculate the optimal drive direction. To calculate drive direction, target position must be measured in at least two distinct vehicle rolling positions. Depending on where the target is placed on the rolling vehicle, it may be necessary to perform some orthogonalizations of the measured target coordinates. If targets are imaged while attached to the frame or body of the vehicle or the center of the wheel, they should travel in a straight line. But if, for example, the targets are positioned on vehicle wheels, they will in general trace out a cycloidal trajectory. For this scenario, the direction of best-fit lines through the target centers will depend on the phase angle of the target on the wheel at the various data acquisition positions. In other words, the target will oscillate with some translation component in directions that are orthogonal to the true vehicle drive direction.

These deviations from the true vehicle drive direction can be subtracted from the measured target locations by reference to external measurements that are approximately orthogonal to vehicle direction. For example, by using the gravity plane or the plane along which the vehicle rolls, the normal of the gravity plane or the rolling plane can be used as a direction to remove the orthogonal component of the target oscillations. This reduces the uncontrolled variability in the measurement of vehicle drive direction, enabling a more accurate and repeatable drive direction measurement.

Once target positions have been orthogonalized as described above (if needed), the array of 3D center locations are then used as input to a well-known least squares calculation algorithm. The optimal drive direction is computed using least squares methods to determine the primary direction of target motion on each side of the vehicle. The net result of this calculation, carried out independently for the left and right sides, is vehicle drive directions DDL, DDR measured in each of the left camera 10L and right camera 10R coordinate systems.

It must also be noted that for vehicles with front wheel steer (either because front wheels are turned, or because individual front toe angles are badly out of spec), targets imaged while attached to the front wheels will experience slightly different trajectories. This problem will compound when rolling distances are larger, and the vehicle is made to turn through a larger semi-circle. For shorter rolling distances, the effect of steer angle should however be quite limited.

In the event that vehicle steer is not negligible, the effects of steer can be detected and compensated for in various ways. One method is to calculate the axis of rotation of the wheel mounted targets between successive positions in the rolling motion, and to use the deviation of the wheel axes with wheel roll angle to determine the steer axis and steer angle. With the steer axis and angle, the nonlinear target trajectories can then be corrected for independently on each side of the vehicle, resulting in steer-adjusted drive directions.

Calculation of Left to Right Side Rotation from Measurement of Common Directions The problem of determining the optimal rotation between left and right camera coordinate systems is an instance of what is known to those in the art as Wahba's Problem. The basic question of this method is: given two or more directions measured in an initial coordinate system, and those same directions measured in a second coordinate system, what is the optimal rotation between the two coordinate systems? This problem can be solved in various ways. If the number of common directions measured in two coordinate systems is exactly two, the so-called Triad method can be used to solve for the optimal rotation between the two coordinate systems. For two or more measurements in common in both coordinate systems, more general solution methods such as the Kabsch algorithm, Davenport's Q-method, and other computational algorithms, are used to determine the optimal rotation between coordinate systems. The details of the methods vary, but the essence of all such methods is to solve for the rotation that minimizes the least-squares error when rotating from one coordinate system to the other. Most methods incorporate a singular value decomposition of the 3D covariance matrix of the pairs of corresponding 3D vectors.

As depicted in FIG. 1A, the two common directions on the left side of the vehicle 30 are the vehicle drive direction DDL in the left camera 10L coordinate system, and the gravity direction GDL in the left camera 10L coordinate system (originally measured in the left inclinometer coordinate system, but transformed to the left camera coordinate system using the previously described inclinometer to camera calibration). The vehicle drive direction and gravity direction are similarly measured in the right camera 10R coordinate system. These pairs of vectors DDL, GDL and DDR, GDR on each side of the vehicle 30 are then input to the least squares rotation estimation algorithm, and the 3D rotation that optimally rotates vectors from the left side of the vehicle to the right side (or vice versa) is the output. The 3D rotation can be expressed as a 3×3 rotation matrix, a 3 element vector of Euler angles, a 4 element unit quaternion, or other representation of rotation. The specific format is not material, and the various representations are interchangeable.

The Need for at Least Two Unique Directions

It must be emphasized that two or more unique common directions are required to calculate a unique 3D rotation between the two coordinate systems. With no common directions between the two coordinate systems, we have no information at all to constrain the rotation between. With only one common direction between both coordinate systems, we do not have enough information to determine a unique rotation between coordinate systems.

It must also be emphasized that the two or more common directions used to determine the optimal rotation between coordinate systems must be unique directions. If the two directions were parallel, they would actually point in the same direction. The more unique the directions, the better. Ideally, the common directions are orthogonal or nearly so. The more orthogonal the directions are to each other, the greater the amount of unique information that is incorporated into the calculation of the optimal left to right rotation solution.

ALTERNATIVE EMBODIMENTS OF THE INVENTION

The embodiment described above uses cameras 10L, 10R and inclinometers 102L, 102R to measure vehicle drive direction and gravity direction, respectively. However, the basic principle of correlating two coordinate systems based on measurement of two or more common directions can be extended in various ways.

Principle of Operation not Restricted to Vehicle Drive Direction and Gravity Direction The disclosed "drive direction" aligner uses vehicle drive direction and gravity direction as the common directions to measure on both sides of the vehicle. The core concept of determining the relative left and right sides of the vehicle, however, does not require these two directions. Any two or more common directions can be used to perform alignment measurements in the manner described. One could employ, for example, a magnetometer to use the measured direction to the magnetic north pole as a common direction that will be (for all practical purposes) the same on both sides of the vehicle. Another sensor which could be employed is a gyroscope, where the left side and right side gyroscopes are configured so as to measure a common direction. These are just some examples of other ways in which common directions can be measured on both sides of the vehicle.

Use of More than Two Common Directions

In the measurement system described, two corresponding directions are measured on both sides of the vehicle to determine the left side to right side transformation. The number of corresponding directions need not be restricted to two, however. Arbitrarily many corresponding directions can be used to determine the left to right orientation. The calculation algorithms employed are not restricted to two common directions, so long as the additional directions in common are not parallel and thus provide complementary information to restrict the optimal solution.

Use of Only One Common Direction in a Reduced Functionality System

As described, at least two 3D common directions are required to determine a unique 3D rotation between left and right sides of the vehicle. However, it is possible to retain some of the functionality of the system described if only one corresponding direction is measured on left and right sides of the vehicle. For example, it is possible to determine 2D rotations from just one common measured direction. This may be useful, for example, in a scenario wherein wheel alignment measurements are desired in a strictly 2D mode of operation.

Use of Alternative Gravity Measurement Sensors and Methodologies

As described, measurement of the gravity direction on both sides of the vehicle is performed with a conventional inclinometer. There are various other ways, however, in which gravity direction can be measured without using an inclinometer. Accelerometers could be used in lieu of inclinometers to measure gravity direction. Plumb lines or similar free-hanging masses could also be used to provide a measure of gravity direction. If the cameras themselves can be secured such that they do not rotate with respect to the vehicle rolling surface plane, one can perform a prior calibration step to determine the normal of the rolling surface in each of the left and right camera coordinate systems. This normal direction can then be used to provide a common reference direction for both sides of the vehicle.

Use of Preexisting Vehicle Feature Points in Lieu of or in Addition to Targets

In the embodiments described herein, targets of a predetermined geometry are fixed to a vehicle and measured with cameras to determine vehicle drive direction. Targets are not required, however, as there are various ways in which 3D drive direction can be determined without reference to them. One example is to use stereo vision techniques. For example, if stereo cameras are used on each side of the vehicle, textured feature points can be matched in all cameras of each stereo camera array so as to provide 3D position measurements. These feature points can then be tracked as the vehicle rolls and used in an analogous manner to a target with a predetermined geometry.

It is possible to use additional techniques other than stereo vision to measure vehicle drive direction without employing a target with a predetermined geometry. One could use structured light projection techniques to determine the 3D position of feature points throughout the vehicle rolling motion, and then used in an analogous manner to a target with a predetermined geometry.

One could also use "structure from motion" techniques to determine the 3D geometry of textured vehicle feature points from a single camera, provided some additional constraints about camera motion. With such techniques, a single camera effectively becomes a stereo camera array.

Use of "Live" Inclinometer to Camera Calibration

In the embodiment of FIGS. 1A-B, the relative transformations between the two sensors of interest (cameras 10L, 10R and inclinometers 102L, 102R) are known at the start of the alignment due to a prior calibration process (or processes). The assumption is that the relative pose of the sensors does not change between the relative sensor orientation calibration process and the time at the start of the alignment measurement process. For certain scenarios, however, it may be advantageous to not rigidly couple the camera and inclinometer, at which point the relative sensor orientation must be determined through the course of the alignment process. This distinction (relative sensor orientation performed before or during the alignment process) is not germane to the core novelty of the invention.

Calculation of Alignment Angles

Given the above measurements, calibrations, and intermediate transformations, how does one calculate wheel alignment angles of interest from such a measurement system? Once key equivalences are established, the basic geometric quantities of interest are much the same as in traditional wheel alignment measurement systems that directly measure right side to left side transformations.

Measurement of Runout Compensation

Runout compensation of the wheel mounted targets is performed in the same manner as prescribed in traditional wheel alignment systems. The concept and calculation of runout is discussed, for example, in U.S. Pat. No. 5,535,522. The core concept is to observe the orientation change of a coordinate system that is rigidly mounted to a vehicle wheel. The orientation change of this coordinate system as the wheel rolls allows for a calculation of the optimal wheel axis of rotation. The only addition to this concept in a "drive direction" aligner is a downstream step in the processing chain where all wheel axes are transformed into a common coordinate system (i.e., from the right side of the vehicle to the left side) using the optimal right side to left side rotation.

Establishing a Vehicle Coordinate System (VCS)

The notion of a Vehicle Coordinate System (VCS) is a commonly used concept in wheel alignment. See, for example, U.S. Patent Application Publication 2017/0097229. The VCS serves as a frame of reference in which alignment angles can be expressed. In the prior art, camber angles are commonly defined with respect to the VCS (X, Y) plane, and individual toe angles are commonly defined with respect to the GCL (Geometric Center Line) or the thrust line of the vehicle.

Calculation of the GCL in a "Drive Direction" Aligner

Figure 2C:
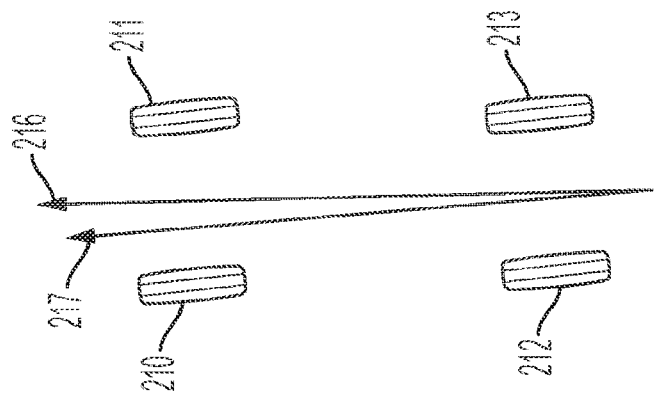
FIGS. 2A-2C illustrate vectors relevant to drive direction principles of operation according to the present disclosure.
Figure 2B:
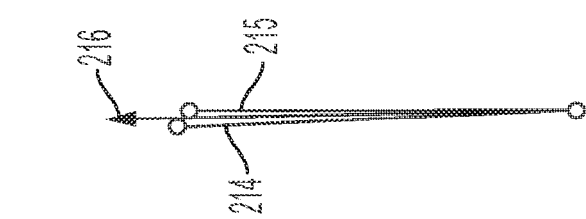
Figure 2A:
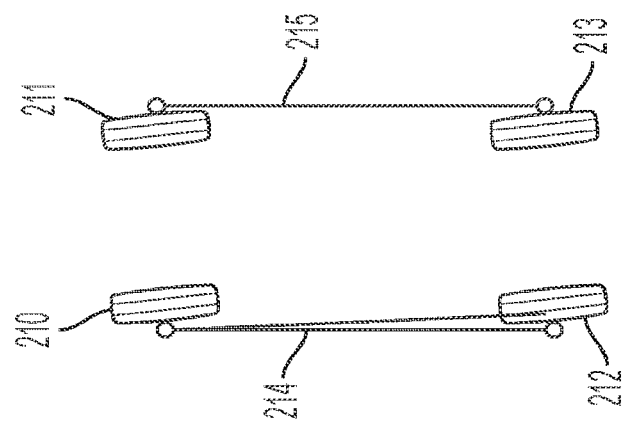

In the prior art, the geometric center line (GCL) is calculated as the direction from the middle of the rear wheels to the middle of the front wheels. This is depicted in FIGS. 2A-2C. In a measurement system which lacks a direct measurement of left to right sides of the vehicle, it may seem impossible to measure GCL. A deeper examination of vehicle geometry shows, however, that it is possible to measure a mathematically equivalent GCL with some additional information about vehicle geometry.

A typical GCL measurement process when direct measurements are made between left and right sides is depicted in FIGS. 2A-2C. With direct left to right measurements of wheel centers, one can directly calculate the middle of the rear axle and the middle of the front axle. The middle of the rear axle is calculated by averaging the 3D positions of the left rear wheel 212 and the right rear wheel 213 using conventional visual techniques. The middle of the front axle is calculated by averaging the 3D positions of the left front wheel 210 and the right front wheel 211. The vector from the mid-rear axle to mid-front axle is demonstrated in 216, which is the GCL.

In a drive direction aligner described herein, a mathematically equivalent GCL direction can be measured despite not directly measuring the left to right side transformation. The vector from the center of the left rear wheel 212 to the left front wheel 210 is denoted by 214. The vector from the center of the right rear wheel 213 to the right front wheel 211 is denoted by 215. When rear to front wheel vectors 214 and 215 are averaged, the vector is mathematically equivalent to the previously described GCL vector 216.

The thrust direction 217 is calculated based on the rear toe angles with respect to the GCL 216. The front toe angles are calculated with respect to the thrust direction 217.

Calibration of Vehicle Rolling Surface with Respect to Gravity

To measure camber in a way that is independent of the tilt of the rolling surface with respect to gravity, we must measure the tilt of the rolling surface (e.g., an alignment lift) with respect to gravity. After we have performed this calibration, we can characterize the orientation of the plane of the alignment lift in the inclinometer coordinate system, and from there (using other calibrations and live measurements) transform the normal of the alignment lift to other coordinate systems.

Figure 3:
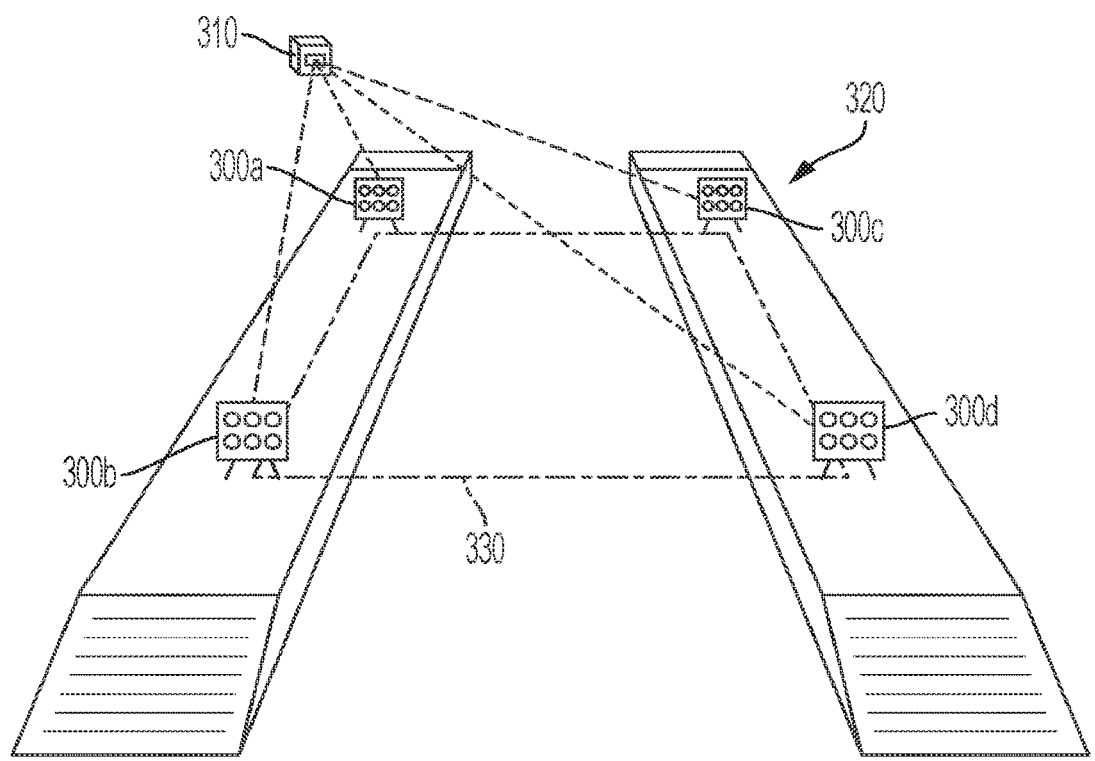
FIG. 3 illustrates a method of orienting an alignment lift with respect to gravity.

There are various methods by which this lift orientation with respect to gravity can be performed. One method is depicted in FIG. 3. The essence of this method is to view targets of known geometry 300*a-d* from a static camera/inclinometer assembly 310, where the calibration between the inclinometer and camera is known from a previously described calibration. The targets 300*a-d* are positioned on the alignment lift 320 at approximately the locations of the vehicle tires. The positions of the targets 300*a-d* in the camera coordinate system at all four wheel locations is measured. A best fit plane 330 is calculated from these four points, and the normal of this best fit plane 330 is calculated in the camera coordinate system. Using the known calibration between the camera and the inclinometer, the orientation of the best fit plane normal in the inclinometer coordinate system can be determined. The tilt angle between the alignment lift best fit normal direction and the gravity direction can then be determined using standard trigonometric functions and stored for later use.

Defining the Basis Vectors of the VCS

The three mutually orthonormal 3D Cartesian basis vectors that define the orientation of the VCS are defined from the geometric quantities defined above. The Y axis of the VCS, corresponding to the longitudinal axis of the vehicle, is defined as the GCL. The Z axis of the VCS corresponds to the vertical dimension of the vehicle, and is approximately aligned with the direction of gravity. We use the previously performed calibration of the alignment lift with respect to gravity to determine the transformation from the measured gravity vector to the orientation of the alignment lift normal in the inclinometer coordinate system. The alignment lift normal is transformed from the inclinometer coordinate system to the left camera coordinate system— this transformed vector constitutes the Z axis of the VCS. The alignment lift normal is further orthogonalized to remove the component that is parallel to the measured vehicle drive direction. The VCS X axis is then defined as the cross product of the VCS Y axis and the VCS Z axis.

Calculation of Basic Alignment Angles

Once the VCS has been determined and all wheel axes have been measured and transformed into the VCS, the alignment angles can then be determined in a well-known manner. The wheel axes are projected onto various 2D planes of the Vehicle Coordinate System. Camber angle is defined from the elevation angle of the wheel axes with respect to the VCS (X, Y) plane. The previously described tilt angle of the alignment lift with respect to gravity must also be incorporated and subtracted from the calculated camber angles. Rear toe angles are calculated with respect to the Geometric Center Line 216 as described above. Front wheel toe angles are defined with respect to the vehicle thrust line 217 as described above.

Aligner Architecture

FIG. 1B is a schematic top plan view of certain elements of a conventional computer-aided, 3D motor vehicle wheel alignment system ("aligner"). The aligner of FIG. 1B is an example of an aligner that can be used to implement the disclosed techniques, as will be discussed in detail herein below. In particular, the aligner of FIG. 1B comprises a left camera pod 2 and a right camera pod 4 that are used to align wheels of a motor vehicle. The terms "left" and "right" are used for convenience, and are not intended to require a particular element to be located in a particular location or relationship with respect to another element.

Arrow 30 of FIG. 1B schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 24L, 22R, 24R, respectively. Each alignment target generally comprises a plate 82 on which target information is imprinted and a clamping mechanism 88 for securing the target to a wheel. A left camera pod 2 comprises left alignment camera 10L. Left alignment camera 10L faces the vehicle and views the left side targets 80a, 80b along axis 42. Right camera pod 4 comprises a right camera 10R that faces the vehicle and views the right side targets 80c, 80d along axis 44. Left camera pod 2 also includes a calibration camera 20 mounted perpendicularly to camera 10L. Calibration camera 20 views a calibration target 16 attached to right camera pod 4, to determine the positions of alignment cameras 10L, 10R relative to each other. However, as discussed herein above in the "Drive Direction Principles of Operation" section, a calibration camera and target are not needed when drive direction is calculated and used, as long as a second common direction is determined, as by using inclinometers 102L, 102R attached to the cameras 10L, 10R.

The disclosed aligner further comprises a data processor (not shown), such as a conventional personal computer (PC), having software with instructions to cause the data processor to perform the calculations described herein electronically.

Fast Measurement Process

A technology usable to enable the disclosed aligners and the functionality described herein is a very fast measurement process. This known process is described in U.S. Pat. No. 10,072,926. The core measurements of interest are the poses (positions and orientations) of targets that are rigidly mounted to the vehicle wheels. Performing a fast measurement process thus equates to performing measurements of target pose very rapidly. In imaging aligners, computing pose rapidly involves performing optimized image processing and applying optimized iterative algorithms to estimate the position and orientation of the reference targets. The high speed measurement process provides for many updates and checks to be performed during the course of a wheel turning processes which may only take several seconds. To measure the pose of wheel mounted targets from individual cameras, such as cameras 10L and 10R of FIG. 1B, it is essential to have calibrated cameras. Calibrated cameras are ones which have had their internal geometry (focal length, camera center point, lens distortion) characterized by a camera calibration process.

Examples of well-known camera calibration processes are the Heikkila method; Zhang's method; the Faugeras-Luong method; the Hartley-Zisserman method; and the Triggs method. To compute the 3D pose of a target from a single 2D camera it is further required to have knowledge of the geometry of the target that is being observed. With knowledge of the target geometry and knowledge of the internal camera geometry, it is possible to compute the 3D pose of that target based on a single 2D image. An example of a commercially available "fast" camera usable to implement the disclosed aligners is the VC Z series camera available from Vision Components GMBH of Ettlingen, Germany.

The process of computing target pose is conventional, and starts with acquiring an image of the wheel mounted target. This image is then processed to identify image feature points that correspond to reference fiducials in the target. These reference image points are then associated with reference fiducial points in the target. Finally, an iterative pose estimation process is performed. Pose estimation answers the question, "Where does a target need to be located, and how must it be oriented, to produce the pattern of image feature points that I measured?"

In certain embodiments of the disclosed aligners, the entire measurement process (image acquisition, image processing, image feature point to target fiducial point correspondence, and pose estimation) is performed repeatedly in a loop for all targets used until target pose information is no longer needed for the alignment process. To acquire measurements very rapidly (for example, greater than 20 poses per second) it is necessary to perform all four steps rapidly. The data processing steps must be implemented with highly efficient algorithms and they must also be implemented on processors with architectures that are optimized for the image processing and numerical linear algebra steps used in the data processing algorithms. Examples of well-known processors with architectures optimized for image processing and numerical linear algebra include DSPs (Digital Signal Processors); GPUs (Graphics Processing Units); FPGAs (Field Programmable Gate Arrays); and ASICs (Application Specific Integrated Circuits). Examples of highly efficient data processing algorithms include Gaussian filtering; gradient descent optimization; Sobel edge detection; Canny edge detection; SURF feature point detection; and optical flow point tracking. An example of a commercially available processor with architecture optimized for the application of this disclosure is Model TDA2x ADAS DSP/ARM System-on-Chip processor, available from Texas Instruments of Dallas, TX.

In certain embodiments, the data collection procedures and advanced analytics described herein below are performed using "intelligent cameras" that are fast and perform all the data processing for the aligner, including serving the user interface, preprocessing image data, and calculating alignment parameters. More particularly, the intelligent cameras (e.g., the cameras 10L, 10R shown in FIG. 1B) acquire images and preprocess the image data. Preprocessing generally includes manipulating image data to prepare it for use in calculating alignment parameters, such as alignment angles. Examples of well-known preprocessing operations include background subtraction, gradient calculation, derivation of positional data, and data compression for reduced bandwidth. Preprocessing of image data is described in detail, for example, in U.S. Pat. No. 7,069,660. Preprocessed image data from both cameras is used; for example, to calculate alignment angles, which are served to a display device. In other embodiments, only one of the two cameras performs the processing and calculating of alignment parameters.

Figure 4A:
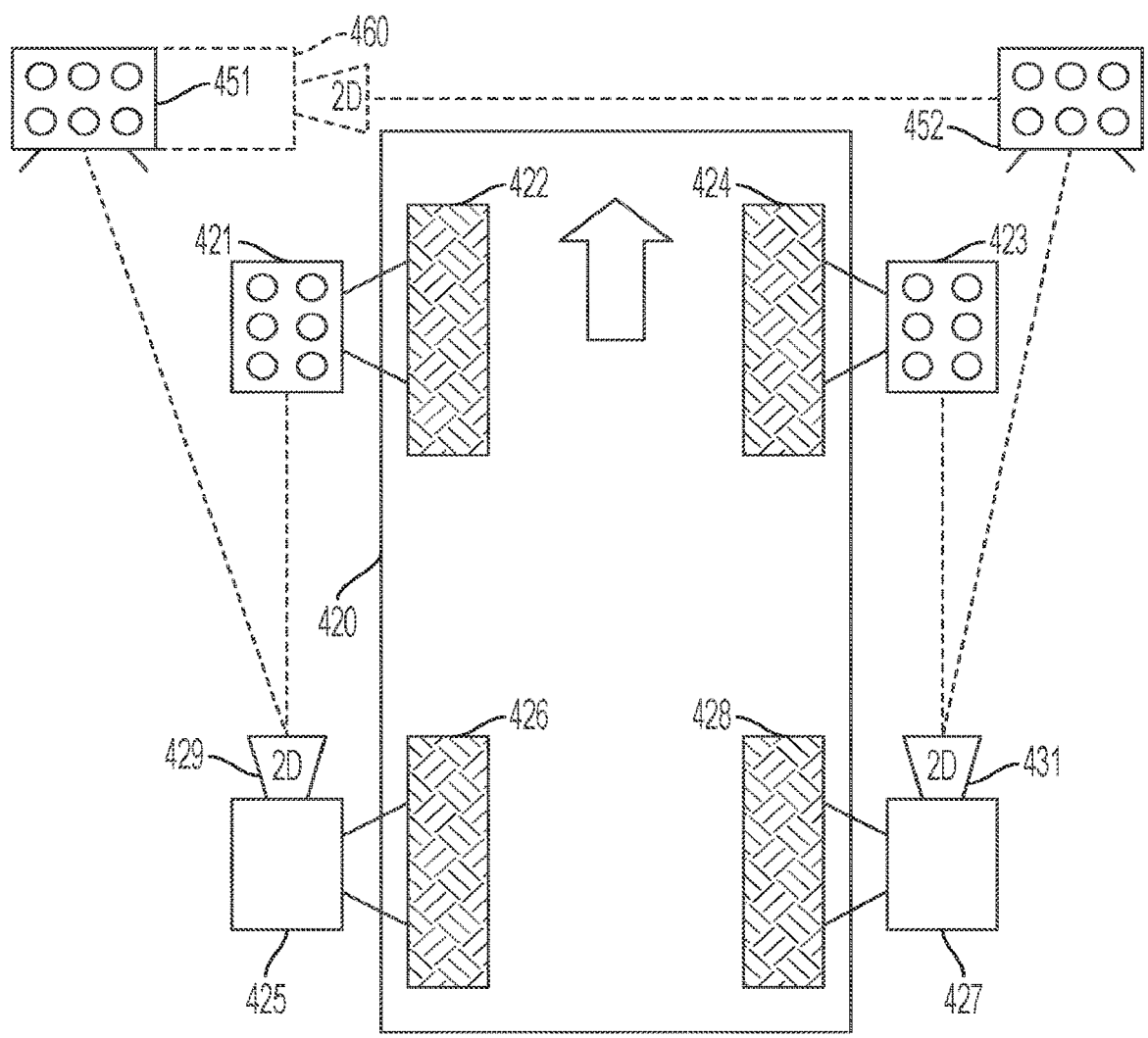
FIG. 4A is a schematic plan view of a 3D visual vehicle wheel aligner.

Wheel Alignment Systems and Methods Using Drive Direction Calculation and Having Active Sensors Mounted on a Vehicle A typical conventional vehicle aligner uses sensors, such as cameras, to measure positions and angles of each wheel of the vehicle. One embodiment of such a wheel aligner uses a passive head having an optical target on each of the wheels of one axle (e.g., on the front wheels) and active sensing heads including a camera on each wheel of the other axle (e.g., on the rear wheels) to measure alignment angles. The active heads also include sensors to spatially orient the sensors on each wheel. Such an aligner is illustrated in FIG. 4A. Targets 421, 423, and active heads 425, 427 mounted in association with the vehicle wheels 422, 424, 426, 428 are used to measure alignment angles of the left and right side wheels independently. A second set of targets 451 and 452, which are not attached to the vehicle 420, are used to spatially orient the left side sensors to the right side sensors. Passive target 451 is fixed to a 2D camera 460. Target 451 is visible to the camera 429 of active sensor head 425. Passive sensor target 452 is visible to the 2D camera 460 attached to target 451 as well as the camera 431 of active sensor head 427. In this embodiment the spatial orientation of left side sensor and target to right side sensor and target requires a complex calibrated target/sensor assembly 451/460 as well as a clear view of passive target 452. The area required for clear view of target 452 can be blocked by the vehicle being measured, by equipment, or by personnel.

The disclosed technique of vehicle alignment using a drive direction calculation improves over current and previous alignment systems by removing the need for a direct measurement to spatially relate the left side to the right side wheel measurements. Instead, the spatial relationship of the left side to the right side can be known by combining two directional vectors that are common between the left and right sides, as discussed herein above in the "Drive Direction Principles of Operation" section. Some directional vectors that are common between left and right sides include, but are not limited to, direction of vehicle movement (i.e., drive direction), direction of gravity, Earth's magnetic field, direction to a common radio signal, direction to a common light source, direction to a common passive sensor, or direction to the floor or lift surface.

In certain disclosed embodiments, a wheel alignment system includes a pair of passive heads and a pair of active sensing heads. The passive heads are adapted for mounting in association with a first pair of wheels of a vehicle that is to be measured by operation of the wheel alignment system. The active sensing heads are adapted for mounting in association with a second pair of wheels of the vehicle. Each of the passive heads includes a target; e.g. as may be observed by an image sensor. Each active sensing head includes an image sensor for producing image data, which is expected to include an image of a passive target when the various heads are mounted on or in association with the respective wheels of the vehicle. The newly disclosed system does not require an extra sensor module to determine the spatial relationship of the active sensing heads. The image sensor alone, or in conjunction with other sensors such as a gravity sensor, can be used to determine the direction of movement of the wheels on each side of the vehicle. Through well-known calibrations of the image sensor to the gravity sensor, the relationship between the vehicle direction and gravity direction can be known. If the vehicle is assumed to be a rigid body, we can assume that the direction of movement of the wheels on the left side of the vehicle is the same as the direction of movement of the wheels on the right side of the vehicle. We can also reasonably assume that the direction of gravity is the same for the left side of the vehicle and the right side of the vehicle. With these assumptions alone and no direct measurement between the left and right sides of the vehicle, we can relate the left side wheel measurements to the right side wheel measurements. The system also includes a processor. The processor processes image data relating to observation of the targets as well as relationship data from the sensor modules. The data processing enables computation of at least one measurement of the vehicle.

In accord with another aspect of the disclosure, a sensing head for use in a wheel alignment system includes a housing or mounting on a wheel of a vehicle that is to be measured by operation of the wheel alignment system and an image sensor mounted to the housing. The image sensor produces image data. In a measurement operation, the image data typically includes an image of a target in association with another wheel of the vehicle. The sensing head also includes at least one tilt sensor mounted to the housing for sensing a tilt angle of the active sensing head when the active sensing head is mounted on a wheel of the vehicle. A processor is responsive to the image data, the sensed tilt angle and a relationship to another head mounted on the vehicle. A communication interface coupled to the processor allows transmission of wheel alignment measurement data, from the active sensing head to a user device of the wheel alignment system.

A method of taking at least one measurement of a vehicle in accord with principles taught herein involves capturing an image of a target associated with a first wheel of the vehicle with an image sensor in a first head mounted in association with a second wheel of the vehicle, to produce first image data. An image of a target associated with a third wheel of the vehicle is captured with an image sensor in a second head mounted in association with a fourth wheel of the vehicle, to produce second image data. The method further entails deriving relationships of the first and second heads relative to at least one reference. The first and second image data and the reference relationship measurements are processed to compute at least one measurement of the vehicle.

Figure 4B:
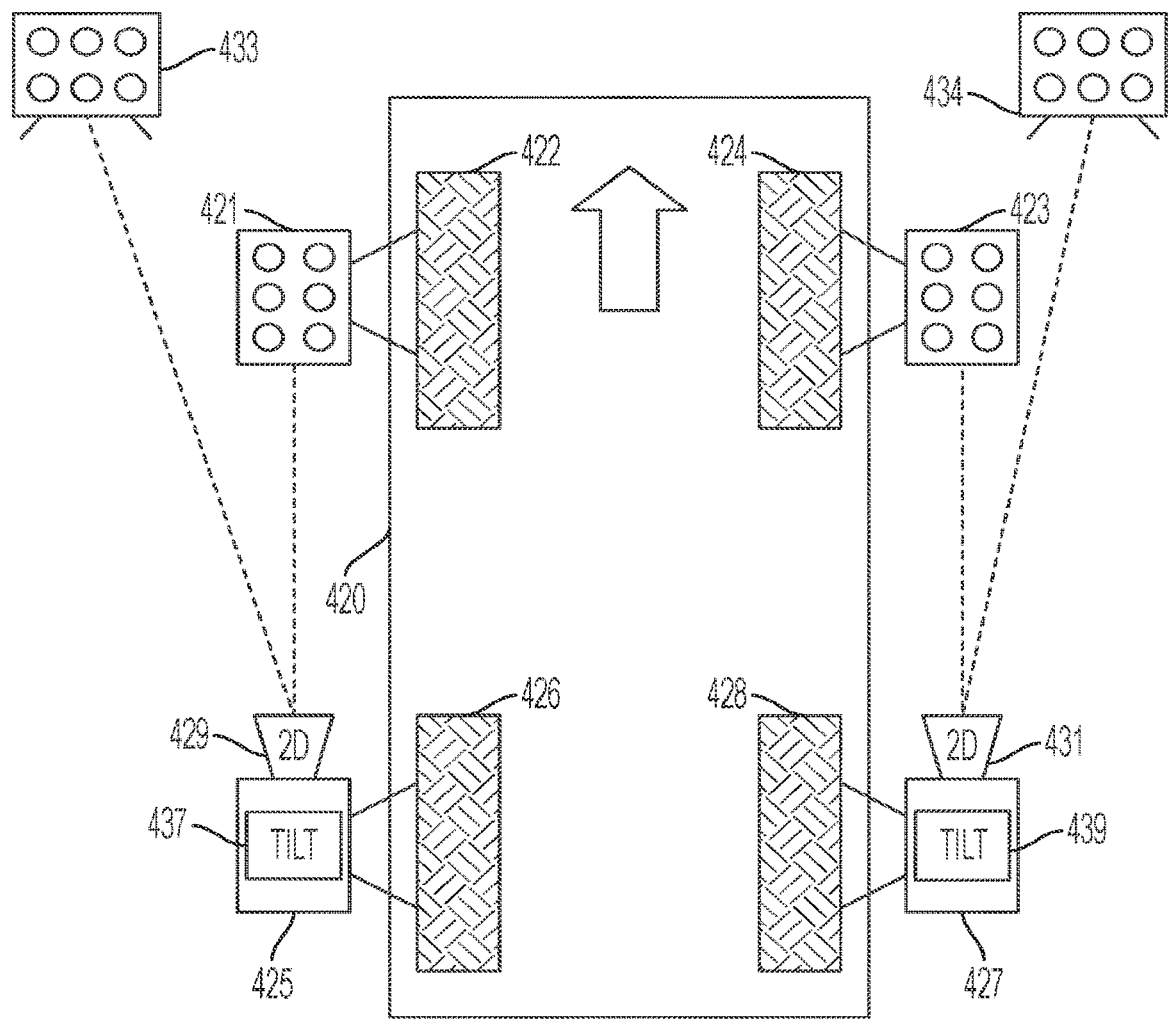
FIG. 4B is a schematic plan view of a 3D visual vehicle wheel aligner according to an embodiment of the present disclosure.

FIG. 4B diagrammatically illustrates an arrangement of targets and active sensing heads in relation to the wheels of a vehicle 420 under test; e.g., to measure one or more wheel alignment parameters, according to certain embodiments of the disclosed aligner. Except for the wheels 422, 424, 426, 428, elements of the vehicle 420 are omitted for ease of illustration.

The wheel alignment system includes a pair of passive heads 421 and 423 mounted on respective wheels 422 and 424 of the vehicle, which are front steering wheels in this example. The system also includes a pair of stationary passive targets 433 and 434 that are placed within the detection range of active sensing heads 425 and 427. The active sensing heads 425 and 427 are adapted for mounting in association with other respective wheels 426 and 428 of the vehicle, in this case the rear wheels. Each active sensing head includes an image sensor 429 or 431 for producing image data, which is expected to include images of the passive targets on one side of the vehicle 420 as shown. In this example, the image sensors 429 and 431 in the active sensing heads 425 and 427 are two dimensional (2D) imaging devices; e.g., cameras.

The targets 421, 423, 433, and 434 are passive in that they do not include any sensing elements. Each of the passive targets 421, 423, 433, and 434 is observed by one of the image sensors 429 or 431 in the active heads 425 and 427. A target 421, 423, 433, or 434 for image sensing by a sensor on another head may be active or passive. An active target, such as a light emitting diode (LED), is a source driven by power to emit energy (e.g., IR or visible light) that may be detected by a sensor. A passive target is an element that is not driven by power and does not emit energy for detection by a sensor. Assuming an image sensor in head 425 or 427, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 425 and 427.

The active heads 425 and 427 also contain gravity sensors or the like to measure tilt, typically camber and pitch, of the head. In this first example, the head 425 includes one or more tilt sensors 437; and the head 427 includes one or more tilt 430 sensors 439.

The system also includes a derived spatial relationship between reference targets 433 and 434. The derived spatial relationship enables knowledge of the spatial relationship between the active and passive sensing devices when the sensing devices are mounted on wheels on opposite sides of the vehicle. For example, the image data of the reference targets 433, 434 is used to calculate plural poses of each of these targets as the vehicle is rolled, thereby reflecting changes in the position of the axis of rotation of the rear wheels 426, 428, as the vehicle is rolled, which in turn can be used to calculate the vehicle drive direction, and wheel alignment parameters. See the "Drive Direction Principles of Operation" section herein above. The spatial relationship between left and right side sensing devises is derived by knowing two or more coordinate directions that are common between the left and right sides of the vehicle. The embodiment shown in FIG. 4B uses vehicle direction and gravity as common coordinate directions. Alignment parameters for vehicle 420 are calculated using drive direction, according to the "Drive Direction Principles of Operation" section herein above.

It will be readily apparent to someone skilled in the art that the wheel alignment systems discussed herein may be implemented with various different types of common coordinate directions. Some other examples of common coordinate directions include but are not limited to Earth's magnetic field, direction to a common radio signal, direction to a common light source, direction to a common passive sensor, or direction to the floor or lift surface.

The disclosed system also includes one or more devices for processing image and sensor data. The processor(s) processes image data relating to observation of the targets, and tilt data from the active sensing heads. The data processing enables computation of at least one measurement of the vehicle. The exact position of the stationary passive targets 433 and 434 are not critical to the operation of the aligner, as long as they are visible to one or more sensing devices of the aligner, and do not move during the alignment process.

Other configurations of targets and sensors on and around the vehicle also work with this new process. For example, the passive targets 421 and 423 could be mounted to rear wheels 426 and 428 with the active sensors 425 and 427 mounted on the front wheels 422 and 424. There could also be configurations where active sensors 425 and 427 are mounted on the vehicle in such a way that targets could be seen on each of the vehicle wheels. In other embodiments, active sensors 425 and 427 are attached to each wheel and each has a view of stationary targets 433 and 434. In a further configuration, the gravity gauges are attached to the passive targets 421 and 423, and the active sensors 425 and 427 include only the cameras. There are many configurations of the various positions/locations of the sensors, more than are mentioned here.

Wheel Alignment Systems and Methods Using Drive Direction Calculation and Having Active Sensors Mounted Off a Vehicle As discussed herein above, some conventional camera based aligners require the left and the right side cameras to be rigidly mounted to a beam and their relative location needs to be known. Other types of conventional camera based aligners use an additional camera to look between the measurement cameras (i.e., across the vehicle) at a target to relate the relative positions of the measurement cameras. All of these aligners require either expensive components, or have structures that can get in the way, or both. Thus, there is a desire for an aligner that does not require extra hardware to calibrate the relative camera to camera positions, and/or one that does not require a rigid beam between the two cameras to free up space for the shop and the technician.

Figure 5A:
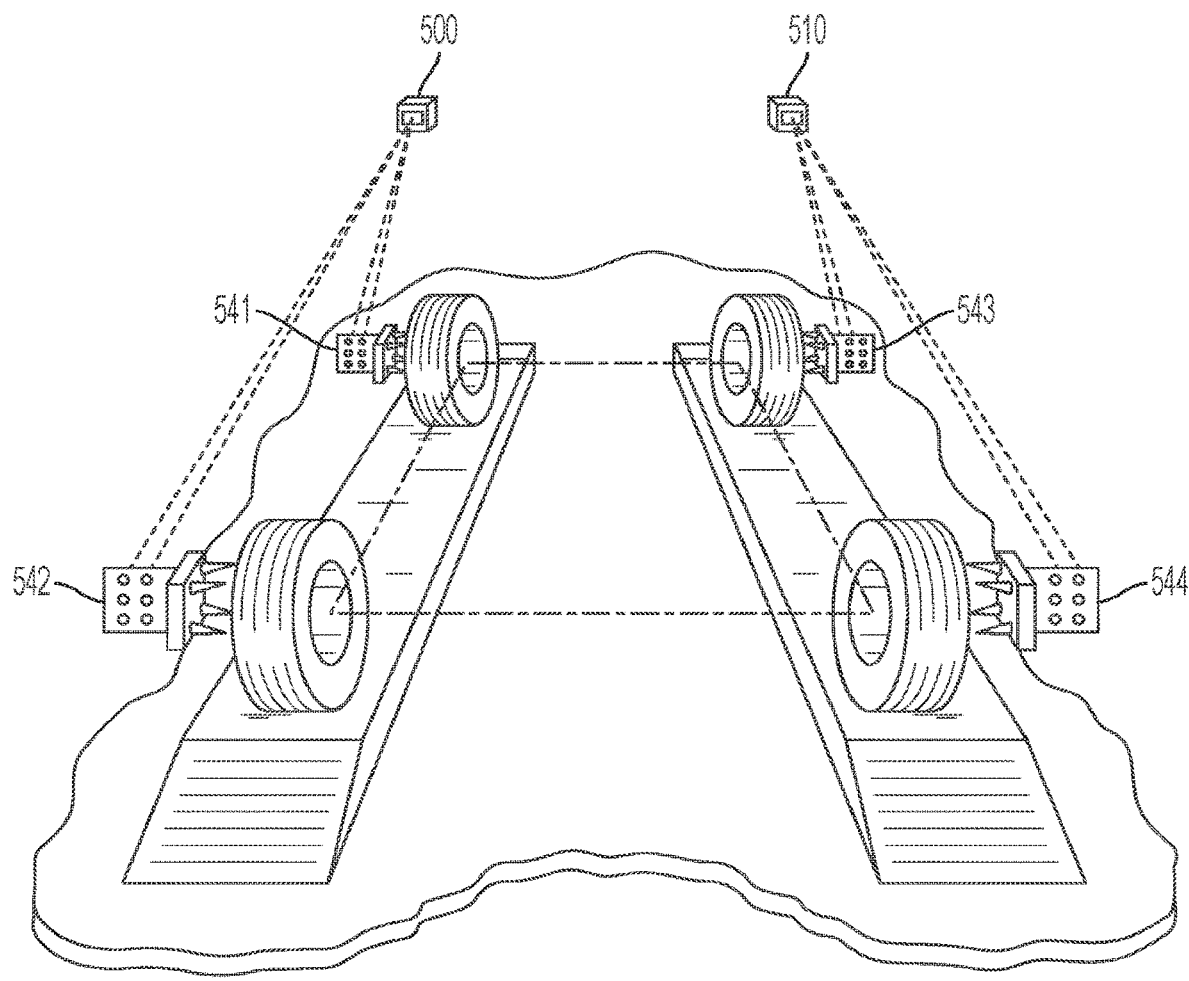
FIGS. 5A and 5B are schematic perspective views of 3D visual vehicle wheel aligners according to embodiments of the present disclosure.

In an embodiment of the disclosed aligner shown in FIG. 5A, two cameras 500, 510 with on board gravity gauges are placed in front of and beside the vehicle to be measured. Two targets (for a two-wheel alignment) or four targets 541, 542, 543, 544 are attached to each of the four vehicle wheels. The cameras 500, 510 measure the pose of the targets 541, 542, 543, 544 and the vehicle is rolled to another position (e.g., about 8") and the cameras re-measure the pose of the wheel targets. Of course, more than two poses of the targets can be measured. The axis of rotation and the drive direction of each wheel is measured from the target poses, and the gravity gauge readings are measured. Using the drive direction vectors and the gravity gauge measurements, the toe and camber are calculated for the vehicle under test, according to the "Drive Direction Principles of Operation" section herein above.

There are many different places the cameras can be positioned to be able to perform this alignment. For instance, in certain embodiments the cameras are placed behind the vehicle. In other embodiments the cameras are instead placed beside or even overhead of the vehicle. Alternatively, the cameras can be mounted on tripods off the floor, on shelves on the wall, or attached directly to the alignment rack or the supports thereof.

Figure 5B:
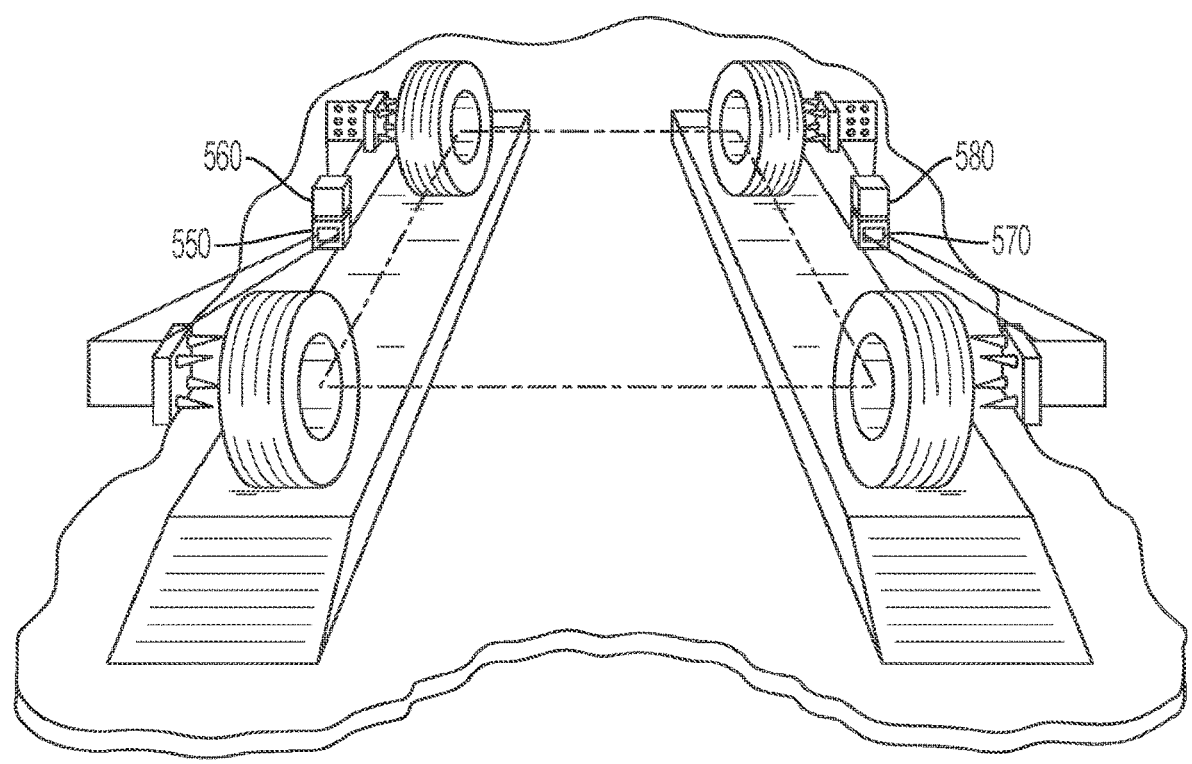

In other embodiments illustrated in FIG. 5B, more than two cameras can be used. For instance, four cameras 550, 560, 570, 580, one for each wheel, can be positioned between the front and rear wheels for a more compact arrangement. For larger vehicles such as trucks, a plurality of cameras can be arranged to view the target attached to a single wheel or combination of more than one depending on the area and size of the truck being aligned.

Performance Enhancements Using Drive Direction Calculation for Visual Wheel Aligners As discussed herein above, conventional camera based aligners require the relative position of the cameras to be known. If the relative positions of the cameras change, then the aligner will measure the vehicle's alignment incorrectly. Also, vehicles being in perfect alignment still can exhibit behaviors that would be considered a bad alignment; for instance, "tire pull" will cause the vehicle to drift and a steering input will be required to keep the car going straight. In this case, the customer would consider that the alignment was not done correctly. Thus, there is a need for a way to diagnose and re-calibrate an aligner if the relative positions of the cameras changes over time. Further, there is a need for an aligner to measure the difference between the measured thrust angle and the actual drive direction to help diagnose and or adjust the vehicle to compensate for it.

In this embodiment, during the positioning sequence when the vehicle is rolled and the cameras measure the pose(s) of the wheel targets to measure the regular alignment angles, a measurement of drive direction is also calculated, according to the "Drive Direction Principles of Operation" section herein above. Comparing the drive direction of each of the four wheels to each other will indicate if the calibration of the relative camera position is still good. Since the drive directions of all wheels should be the same, the amount which they differ from each other is an indication of the calibration of the relative camera position, or other camera calibrations. In many cases, a warning could be given to have the technician to re-calibrate the aligner. In other cases, a change to the calibration can be made to make all the drive directions parallel and thus bring the relative camera position back into calibration. The drive direction errors from wheel to wheel can be averaged over many vehicle measurements to ensure that a single rogue measurement will not change the accuracy of the aligner. Further, if an alignment measurement has a disagreement in the drive direction, it could be an indication of a bad measurement sequence, and a message to the operator could be communicated to re-do the measurement. This is helpful to identify a problem with the measurement sequence before the alignment is performed and the vehicle is adjusted incorrectly.

Figure 6:
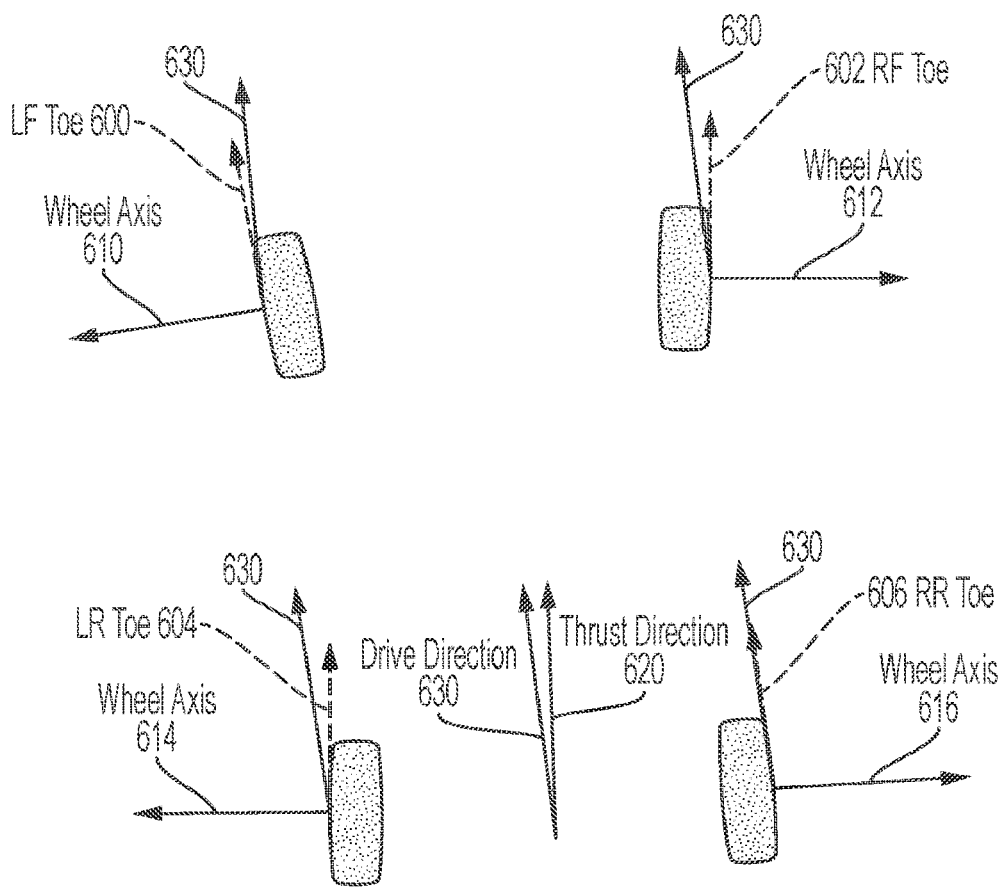
FIG. 6 is a schematic plan view illustrating various wheel alignment parameters of a vehicle.

It is generally accepted that the vehicle will travel along its thrust line (also referred to as thrust direction). To this end, in conventional aligners front toe is displayed on a user interface and thus aligned to the thrust angle of the vehicle. Referring now to FIG. 6, toe direction 600, 602, 604, 606, is defined as the direction the individual tire would travel, and as such it is 90 degrees to the wheel axis 610, 612, 614, 616. The thrust direction 620 is the average of the two rear toe directions. It is generally accepted that the vehicle will travel along the thrust direction. Drive direction 630 is the measured direction in which the vehicle actually travels.

Should the vehicle not travel along the thrust line 620 as defined and measured, then the vehicle will be adjusted correctly to the thrust line 620, but will not actually drive down the road that way and will appear to the operator that it was not aligned correctly. This can be a significant issue as the technician does the alignment correctly, but on a subsequent drive the vehicle behaves as if he did it incorrectly. By comparing the drive direction 630 to the thrust direction 620, we can get a measurement of this issue and how significant it would be in a test drive. If the difference is small (e.g., under 0.1 degree), then there is nothing to be concerned about. However, if there is a large difference (e.g., more than 0.1 degree), then there could be an issue with the drivability of the vehicle even after it is aligned to industry standards. In these cases, it is advantageous that the technician inspect the vehicle for the cause of the difference, and in other cases to align the front wheels to the drive direction or a combination of the thrust and drive directions.

Some of the causes of a deviation between thrust line and drive direction are, but not limited to, different tire pressures, different sized tires, tire rubber with larger rolling resistance on one or more wheels, interactions between toe and camber that affect the contact patch of each wheel.

Drive-Through Aligner Using Drive Direction Calculation

According to further embodiments, a vehicle to be aligned has targets mounted on its wheels, and is driven or rolled between a pair of camera pods each having a plurality of cameras that are positioned to view the targets on one side of the vehicle. The cameras each collect image data of the targets on their respective side of the vehicle, and the system combines the images from the plural cameras to determine a series of poses for each target, which are then used to calculate alignment parameters, such as toe and camber, for the vehicle. The system also calculates the drive direction of the vehicle as the vehicle is moving, and uses the drive direction calculation as a reference for the alignment parameters. The system displays the calculated alignment parameters to the user on a monitor or other display device in a conventional manner, such as with a conventional user interface.

A vehicle wheel alignment system according to the present disclosure has a pair of elongated beam-shaped camera pods, each having plurality of cameras and a calibration target mounted along a horizontal axis of the pod and facing in the same direction. The two pods are mounted with their cameras and calibration targets facing each other on opposite sides of a vehicle to be aligned; for example, on opposing sides of an alignment rack. Targets to be viewed by the cameras of the pods are mounted on the vehicle wheels, and the vehicle is driven or rolled between the two pods and past all of the pods' cameras without a pause.

Each camera of one of the pods is for viewing all the wheel targets disposed on one respective side of the vehicle, and for capturing image data of the targets as the wheels and targets are continuously rotated a number of degrees of rotation without a pause; that is, as the vehicle rolls past the pods. The image data is used to calculate a minimum number of poses of the targets viewed; for example, at least one pose for every five degrees of rotation as the wheels and targets are continuously rotated the number of degrees of rotation without a pause. After the vehicle rolls past the pods, the system processes the captured image data of each target from the plurality of cameras of each respective pod (i.e., the system combines the image data from the plurality of cameras of a pod) to produce a series of poses for each of the targets that cover close to a 360 degree rotation of the target. In one embodiment, three cameras of a pod capture poses covering a 330 degree rotation of each of the targets they viewed. In certain embodiments, each of the pods comprises a data processor for performing the steps of preprocessing the image data, and calculating an alignment parameter for the vehicle based on the preprocessed image data. The calculated alignment parameters are displayed to the user on a monitor or other display device in a conventional manner, such as with a conventional user interface.

A key technology enabling the disclosed aligner and the functionality described herein is the very fast measurement process explained in detail herein above in the "Drive Direction Principles of Operation" section.

Figure 7A:
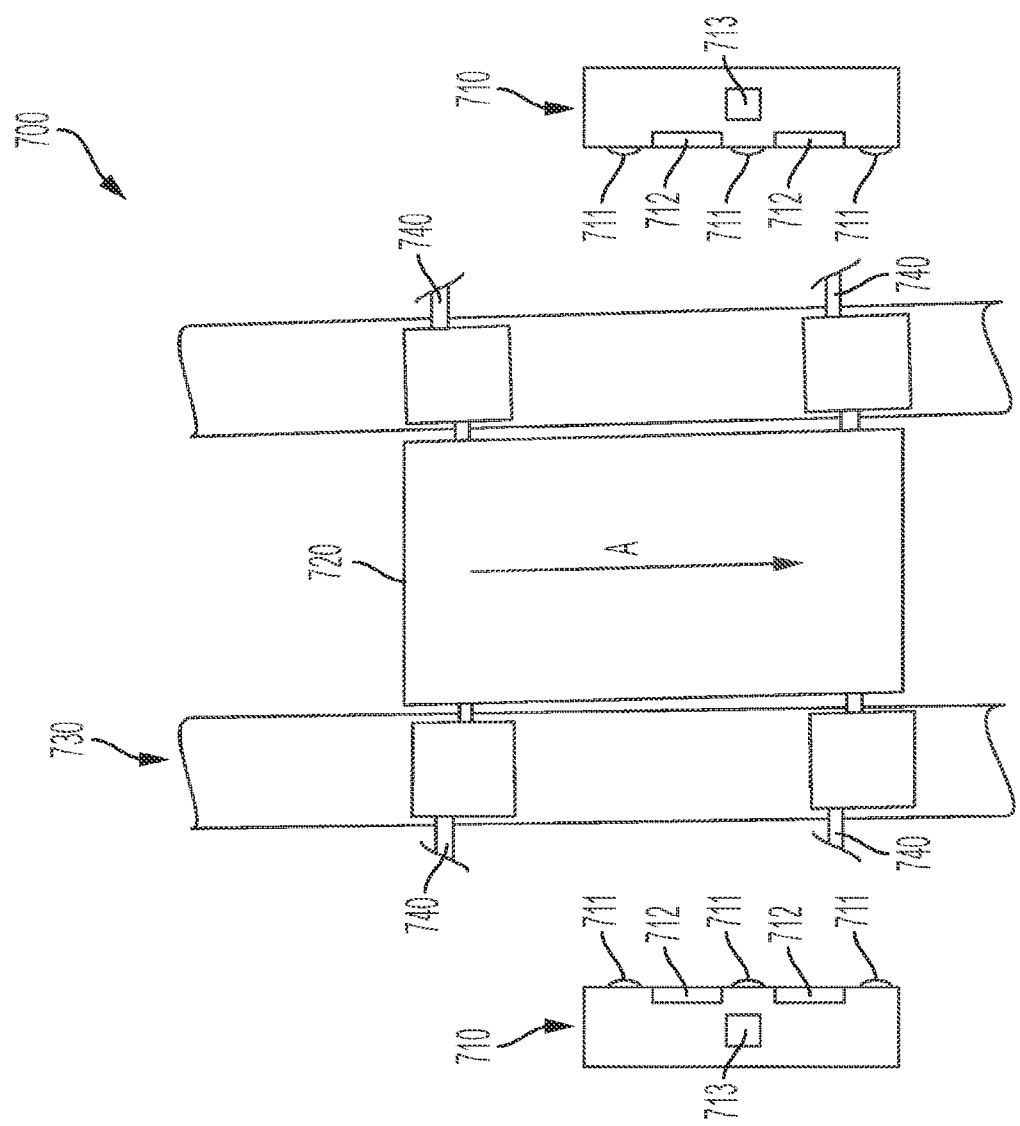
FIG. 7A is a schematic top plan view of an alignment system according to various embodiments.
Figure 7B:
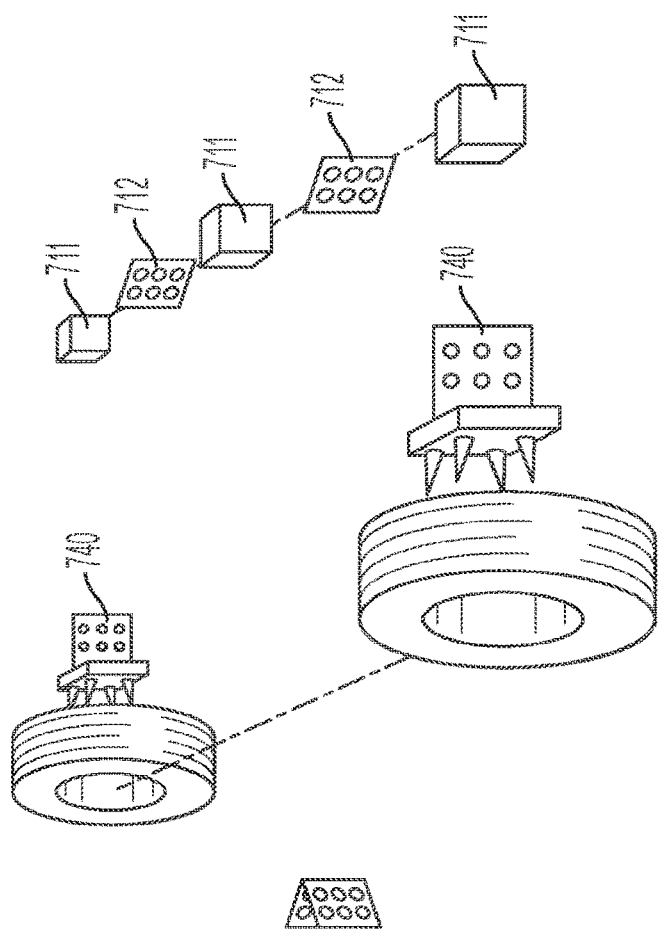
FIG. 7B is a schematic perspective view of the alignment system of FIG. 7A.
Figure 7B:
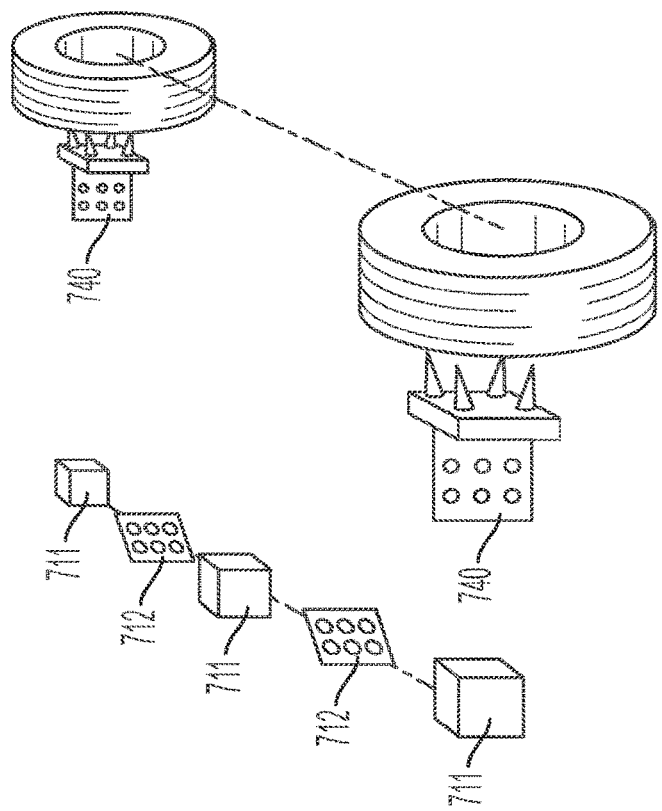
Figure 7C:
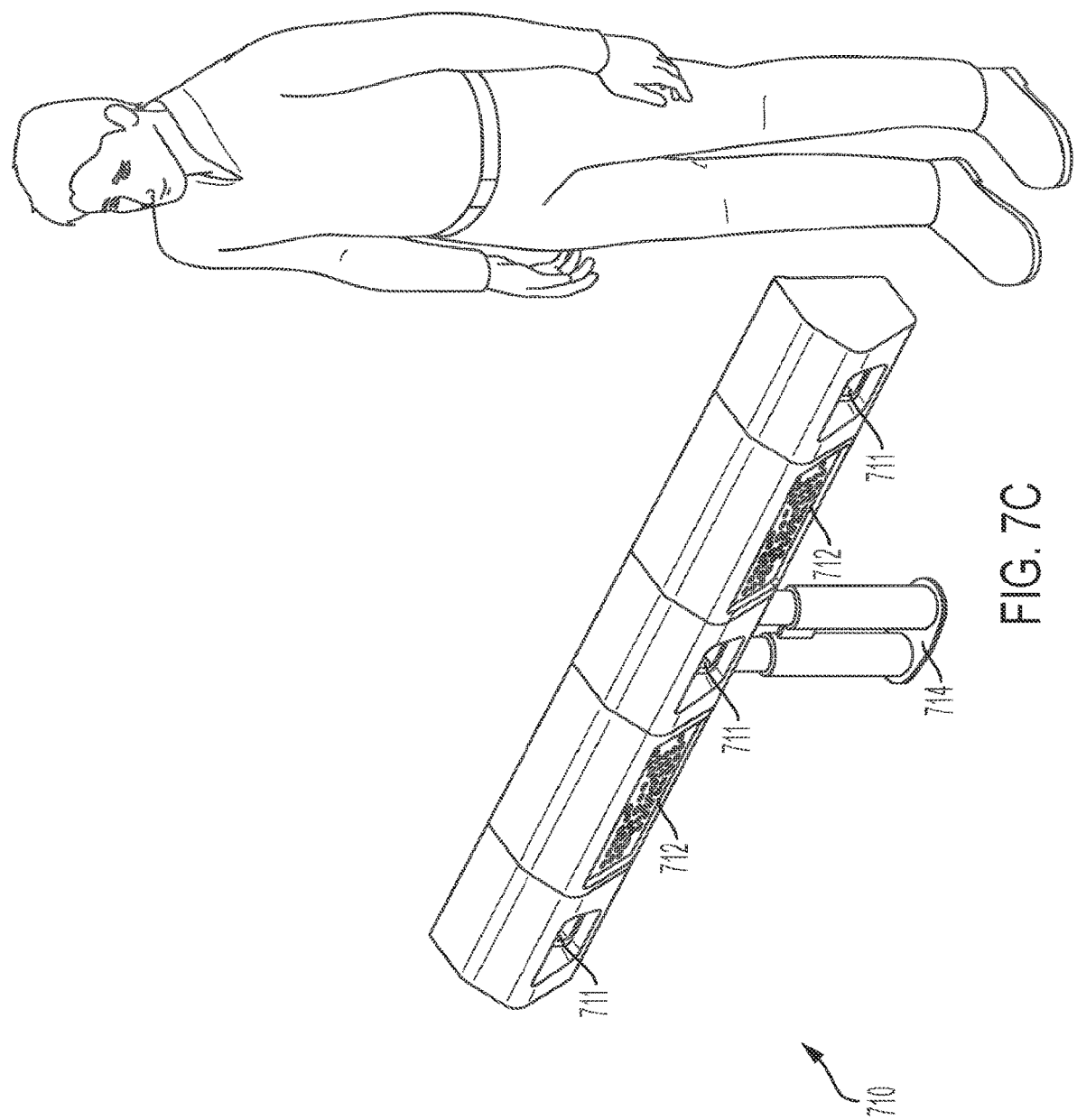
FIG. 7C is a perspective view illustrating an exemplary camera beam according to various embodiments.

An exemplary embodiment of the disclosed aligner will now be described with reference to FIGS. 7A-D. As shown in FIGS. 7A-C, an aligner 700 comprises a pair of camera pods 710, each having three cameras 711 and two calibration targets 712. Each of the pods 710 further comprises a data processor 713 for performing the steps of preprocessing image data, and calculating an alignment parameter for the vehicle based on the preprocessed image data. Pods 710 are disposed with their cameras 711 and calibration targets 712 facing each other on opposite sides of a vehicle 720 to be aligned, such as a tractor of a tractor-trailer combination. In this embodiment, vehicle 720 is on a rack 730 between the pods 710. FIG. 7C illustrates one of the pods 710, which in this embodiment is mounted on a base 714 attached to the floor or other suitable surface.

Figure 7D:
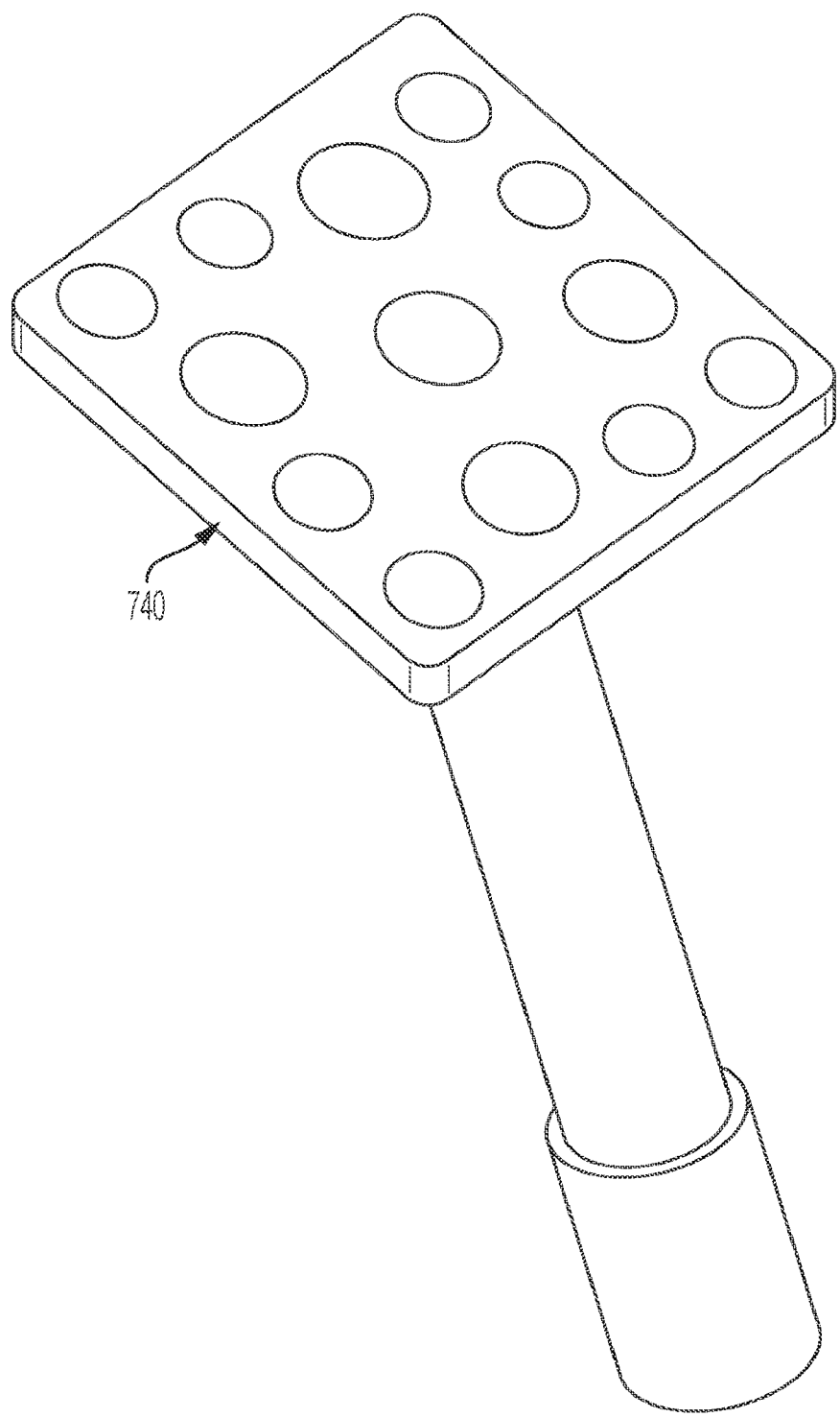
FIG. 7D contains perspective views of several different targets according to various embodiments.

Referring again to FIGS. 7A-B, targets 740 to be viewed by the cameras 711 of the pods 710 are mounted on the wheels of vehicle 720. An embodiment of the targets 740 is shown in FIG. 7D, wherein each target 740 has a tubular support with a magnet at its distal end for attaching to a lug nut or lug bolt of vehicle 720. The tubular supports vary in length between targets to accommodate the shape and/or offset of the wheel to which a particular target 740 is to be attached. For example, the front wheel of a truck will typically require a target with a short support, while a rear wheel of a truck may require a relatively longer support. Each target 740 has a conventional target head with circular indicia, the target head being mounted to its tubular support such that it can be seen by all the cameras 711 of a respective pod 710 when it is mounted to a wheel of the vehicle 720.

Prior to performing an alignment, the calibration targets 712 and cameras 711 are used to position the pods 710 in a conventional manner. In an exemplary embodiment, the pose measurement of the calibration target 712 of one of the pods 710 is calculated from image data from the other pod's cameras 711. The geometry of all the cameras 711 and calibration targets 712 of both pods 710 is known, either from manufacturing tolerances or by calibrating the relative positions of all the calibration targets 712 and cameras 711 using well-known procedures of relative camera to camera position (RCCP), and relative camera to target position (RCTP). A measurement of the relative pose of the two beams with respect to each other is calculated using this information, and is displayed on a monitor. The system's user interface guides the technician to place the pods 710 in optimal positions by displaying the pose measurements and the ranges of acceptability. Distance between pods, parallelism, and offsets are a few of the controlled set-up criteria.

During the alignment procedure, vehicle 720 is driven or rolled between the two pods 710 and past all of the pods' cameras 711 without a pause, in the direction of arrow A, capturing image data of the targets 740. The image data is used to calculate a predetermined minimum number of poses of the targets 40 viewed; for example, at least one pose for every five degrees of rotation of the wheels of vehicle 720.

After the vehicle 720 is driven or rolled past the pods 710, the processors 713 process the captured image data of each target 740 from the plurality of cameras 711 of each respective pod 710 (i.e., the system combines the image data from the plurality of cameras 711 of a pod 710) to produce a series of poses for each of the targets 740 that cover close to a 360 degree rotation of the target. Data processors 713 perform the steps of preprocessing the image data, and calculating alignment parameters, such as toe and camber, for the vehicle based on the preprocessed image data. Due to the use of multiple cameras to determine target poses, the disclosed system's accuracy in measuring alignment parameters is significantly improved over prior systems. For example, while conventional systems are accurate to within 0.05 degree, the disclosed system is accurate to within 0.01 degree or better.

To achieve these high accuracies, a large roll angle for the vehicle wheels is required; e.g., more than 45 degrees of roll. However, for any given camera the roll angle that can be seen by the camera is limited by the camera's field of view (FOV). A camera with a large FOV requires a lens with high distortion and low pixel density, thereby compromising accuracy; but if standard lens cameras having a FOV in the range of 30 degrees are used, the roll angle that can be seen by each camera is limited to 20 or so degrees of rotation (depending on the diameter of the vehicle wheel).

To achieve the desired accuracy in the disclosed system, a roll angle of about 90 degrees is acceptable but even more is desirable. By disposing the cameras 711 of the disclosed system separated from each other in the direction that the vehicle 720 under test is rolled or driven, plural cameras 711 can each see a piece of the vehicle wheels' roll, covering 90 degrees or 180 degrees or even 330 degrees when the pieces are combined, depending on how far apart the cameras 711 are located, and how many cameras 711 are used in each pod 710. Of course, the RCCP must be known so all the cameras 711 measure the wheels' roll in a common coordinate system. Having more than two cameras is advantageous so there can be more coverage. Also, two independent measurements allow the system to check for and either warn of, or compensate for, errors.

In conventional camera-based alignment systems, where the vehicle to be aligned is effectively static, a vehicle coordinate system (VCS) is determined based on the front two wheel locations and the rear two wheel locations. A base plane is determined (i.e., the plane the vehicle is sitting on), and camber is measured thereto. The geometric center line (GCL) of the vehicle is measured based on the centers of the front wheels and the center point between the rear wheels, and rear toe angles are referenced to this GCL as the zero line. See, e.g., U.S. Pat. No. 5,724,743.

In contrast, in the disclosed system, when the vehicle 720, such as a truck, rolls past the cameras 711, the system only sees one axle at a time. To define each axle and determine a coordinate system for them, the wheel centers for an axle are determined in a conventional manner when the axle enters the range of the cameras 711, and then again when it exits camera range. A vehicle coordinate system (VCS) is built as in conventional alignment systems; however, a VCS is built for each axle separately. Note that it is a virtual coordinate system as there aren't two axles used in its determination: just one axle measured in two places. The virtual VCS is created by treating the wheel centers of an axle, upon entry, as a set of rear wheels, and treating the wheel centers of the axle upon exit as a set of front wheels. The virtual VCS is then built as in conventional alignment systems.

The virtual VCS is used to calculate the toe and camber for each axle. Additionally, since the vehicle 720 is a rigid body, each axle has the same drive direction, so the system can compare each axle's toe to each other axle's toe by equating each axle's drive direction. Therefore, the relative toe of two axles can be measured (i.e., the axle scrub), without the cameras 711 seeing both axles at the same time.

Further regarding the drive direction of a vehicle, the direction that the center of each wheel of vehicle 720 moves is measured during the time vehicle 720 moves past the cameras 711, which can be referred to as "the positioning sequence." As explained in detail herein above, since the vehicle is a rigid body, wheel centers are connected to each other (although they rotate independently). Thus, the drive directions of; for example, two wheels of the vehicle are the same. The location of the center of a wheel can be plotted at the beginning and at the end of the positioning sequence, or at many discrete points thru the positioning (also referred to as "run-out") of the wheels. This information can be used to get an overall drive direction from beginning to end of the positioning sequence, or smaller drive directions as the vehicle moves through the positioning sequence. The system can compare the overall drive directions or the smaller discrete ones.

There are many uses for the drive direction calculation in this embodiment. After the two sides of the aligner (both pods 710) are calibrated to each other, drive direction measurements from each side can be determined and compared to confirm that the aligner is still in calibration. If the drive directions are not the same, then the aligner is out of calibration. Additionally, in an embodiment where the system has two cameras, one on each side of the vehicle, but they are not rigidly attached to each other and not pre-calibrated, the drive direction of each side of the vehicle is measured. Since the drive directions should be the same, the location of each camera can be calibrated. This is a significant cost and complexity savings.

A further embodiment removes the need for the RCTP calibration, which is used to find where each beam is located in relation to the other beam. Each beam measures the drive direction of the vehicle, and when we couple that with one or more directions or vectors that are measured by both beams, we can find where one beam is located in relationship to the other beam. Once we know where the two beams are located relative to each other, we can compute the alignment angles in a similar manner as in previous embodiments.

As discussed herein above, the other one or more common directions or vectors can be from a variety of sources. The direction of gravity can be used, the plane between a beam's center camera and the other beams targets, etc. If the embodiment does not use the beam targets, they can be eliminated from the system. If it uses the direction of gravity, each camera pod 710 includes a conventional inclinometer or the like.

In another embodiment, the vehicle is rolled or driven in between the camera beams and stops while the cameras can still see the wheel targets. The aligner continuously checks to see if the wheels have stopped translating and/or rotating to determine when the vehicle has stopped. Once the vehicle has stopped, the user interface automatically displays the live updating alignment angles, enabling the user to adjust the vehicle alignment.

In a further embodiment, the vehicle is rolled or driven in between the camera beams and the aligner detects if the vehicle's alignment needs to be adjusted and tells the user to stop inside the camera beams. The aligner continuously checks to see if the wheels have stopped translating and/or rotating to determine when the vehicle has stopped. Once the vehicle has stopped the user interface displays the live updating alignment angles, enabling the user to adjust the vehicle alignment.

In another embodiment, the pose of the wheel is determined without a target attached to the wheel. There are several conventional ways this can be accomplished, such as by using stereoscopic cameras (i.e., two cameras with overlapping fields of view), structured light, lasers, etc.

Alignment of ADAS Targets Using Drive Direction Calculation

Figure 8A:
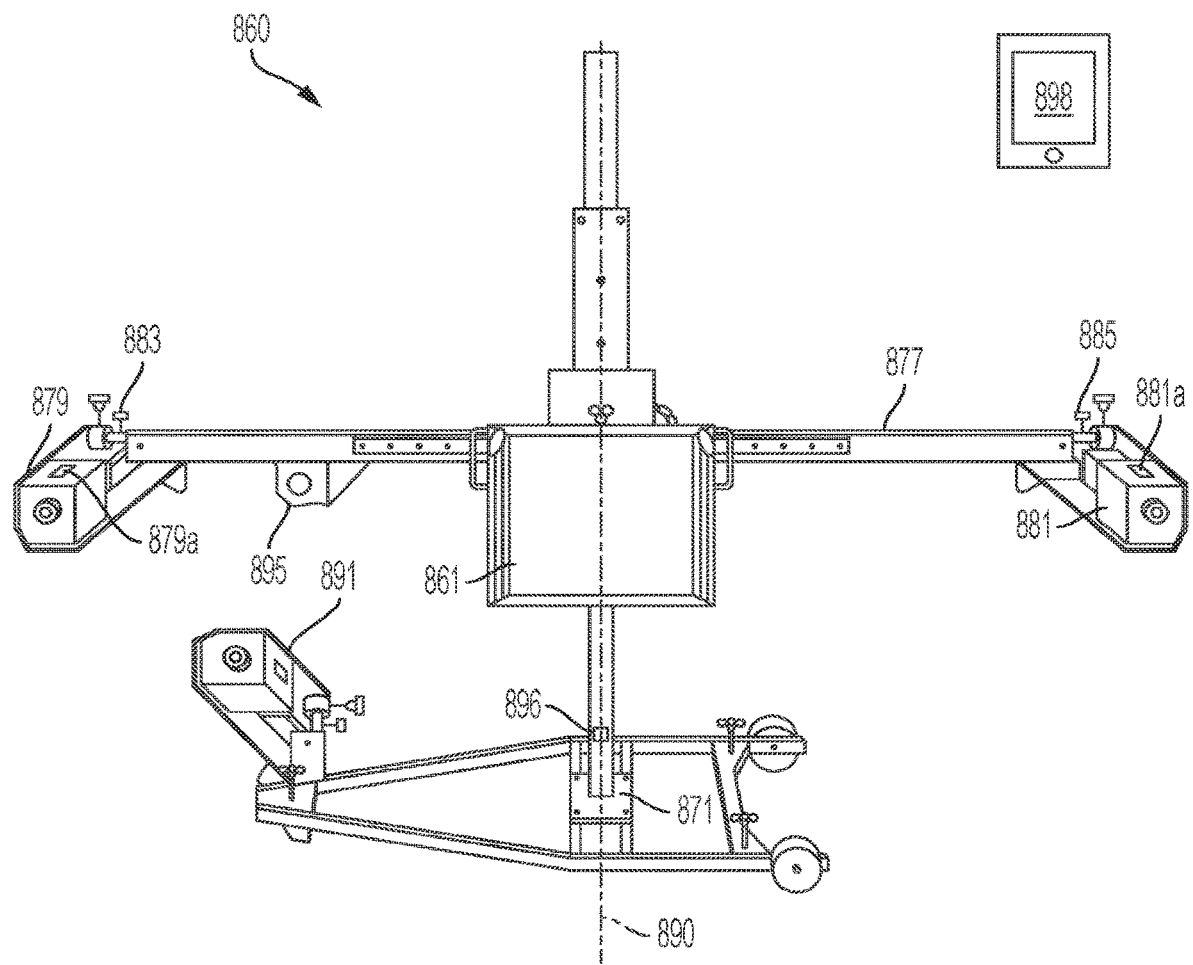
FIG. 8A is a front perspective view of an ADAS calibration element fixture according to an embodiment of the present disclosure.
Figure 8B:
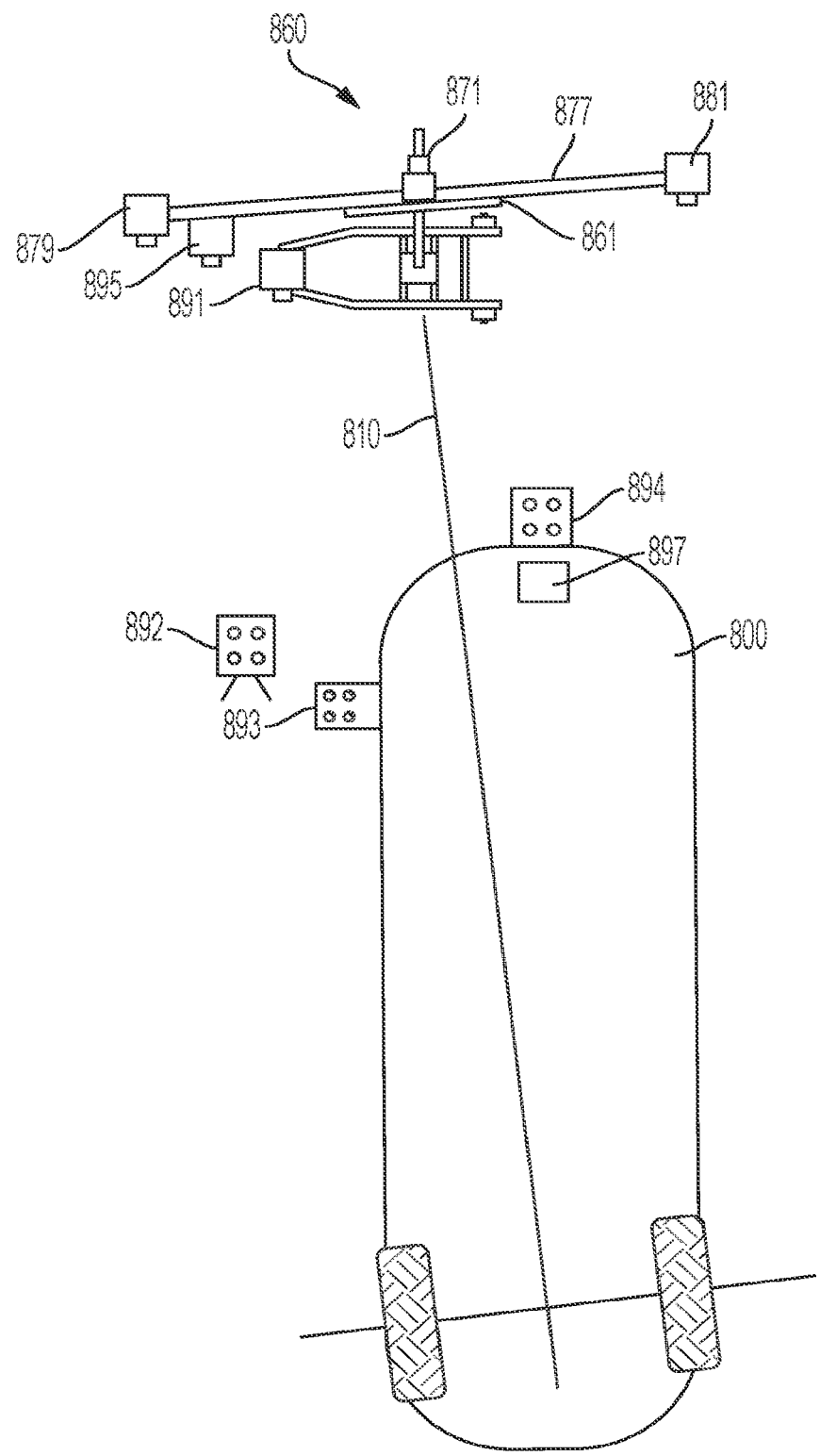
FIG. 8B is a plan view of the fixture of FIG. 8A in use to calibrate ADAS sensors of a vehicle.

Advanced driver assistance systems (ADAS) in vehicles aid the driver and provide an additional level of vehicle safety. This includes systems like adaptive cruise control, lane departure warning, collision avoidance, and rear collision warning. These systems use a combination of sensors like cameras, sonar, and radar that may require calibration to operate correctly. Calibration is performed by placing elements in a known relationship to the vehicle. Calibration elements are known sources or reflectors such as lasers, mirrors, targets, or heat sources. A carrier stand 871 as shown in FIG. 8A is provided to hold the calibration element(s) 861 in a known location relative to the base of the fixture 860. The carrier stand 860 is oriented to the vehicle 800 relative to the desired line of the vehicle like the thrust line 810 as shown in FIG. 8B. U.S. Pat. Nos. 7,121,011 and 6,823,601 have descriptions of types of ADAS, adaptive cruise control, and the structure, use, and operation of a carrier stand.

Conventional systems exist that perform vehicle/carrier stand orientation using simple manual measurement by drawing a grid on the floor or lining up elements using a laser line. Systems also exist that use a computerized wheel alignment system with elements placed on the carrier stands to orient and position the calibration elements in relation to the vehicle. Using a wheel alignment system has many advantages, primarily that the procedures are guided by the aligner user interface, making it faster and requiring less skill from the operator. Moreover, the wheel alignment system can measure and document that the procedure was performed correctly. These systems all depend on direct measurement of the required vehicle line by locating multiple points on the vehicle body or directly measuring the combined direction of the rear wheels. It is desirable to create a lower-cost, simpler system that does not require a full wheel alignment system, while still providing a guided operation to the user to direct the location and orientation of the carrier stand and measure and document the location of the calibration elements.

According to this embodiment, one or more image sensors (such as cameras) are placed on a carrier stand and one or more targets are placed on the vehicle to measure the drive direction of the vehicle, as described in the "Drive Direction Principles of Operation" section herein above. Alternatively, one or more cameras on the vehicle and one or more targets on the carrier stand, including targets for calibration of the ADAS system, can be used to measure the drive direction of the vehicle. The drive direction is assumed to be parallel to the vehicle thrust line and can be used as the line for orientation of the carrier stand to the vehicle. In certain embodiments, drive direction is advantageously used for a direct measurement using a single camera, and the ADAS target is then aligned to that drive direction.

Additionally, the drive direction can be used to relate the orientation of multiple cameras, as described herein above, for measuring the vehicle alignment angles like toe and camber. These angles can be used to establish the thrust or centerline of the vehicle as in a conventional imaging wheel alignment system for the purpose of orienting the carrier stand. The wheel alignment angles can also be used to validate that the vehicle wheel alignment angles meet manufacture requirements before initiating an ADAS calibration.

Embodiments with Two Cameras Mounted to Fixture

Referring again to FIG. 8A, in one embodiment, two cameras 879, 881 are mounted either rigidly or with a pivot point 883, 885 that can be locked to either side of the carrier stand 871 which carries ADAS calibration element 861, such as a target. The relationship between the cameras 879, 881 does not have to be controlled or calibrated. A relationship between the line created by the intersection of the plane of calibration element 861 and the gravity plane must be calibrated or controlled for at least one camera.

The cameras 879, 881 are connected with a wired or wireless communication interface to a display device such as a computer or tablet 898 which is used to present a user interface.

Conventional targets, such as targets 80a-d shown in FIG. 1B, are attached to all of the vehicle wheels using a mechanical device 82 that attaches to the vehicle wheel or tire. The mechanical device 82 creates a known relationship between the target location and the center of the vehicle wheel or the center of the wheel is inferred from the movement of the target as the wheel rotates. These wheel targets are omitted in FIG. 8B for clarity.

The vehicle is rolled forward, backward, or both. The translation of the wheel targets is measured and the drive direction is established. This drive direction along with one additional known common direction not parallel to the drive direction is used to relate the orientation of the left and right camera. In this case, the additional direction used is the direction of gravity referred to as the gravity vector, as described in the "Drive Direction Principles of Operation" section herein above. Each of the cameras 879, 881 consequently includes a gravity sensor, such as a conventional inclinometer 879a, 881a.

As the orientation between the cameras 879, 881 and the carrier stand 871 is known, the stand can be oriented (i.e., rotated) to the drive direction about its centerline 890 as guided by the supported user interface. However, because we need to set the position as well as the orientation of the ADAS calibration element 861, and the left-to-right orientation of the vehicle 800 with respect to cameras 879, 881 is not known, a point or line laser 896 (mounted on the carrier stand 871 normal to calibration element 861 and on the centerline 890 of the carrier stand) is used to align the stand's location and hence the calibration element 861 in relation to the center of the front of the vehicle 800. In other words, laser 896 is used to visually relate the fixture 860 to a point on the centerline of the vehicle 800 (shown as position 2 in FIG. 8C and explained in detail herein below), and the cameras 879, 881 are used to set the rotation of fixture 860 about its centerline 890. Alternatively, an approximation can be made by using a pre-measured distance between the camera mounts on the fixture.

Figure 8C:
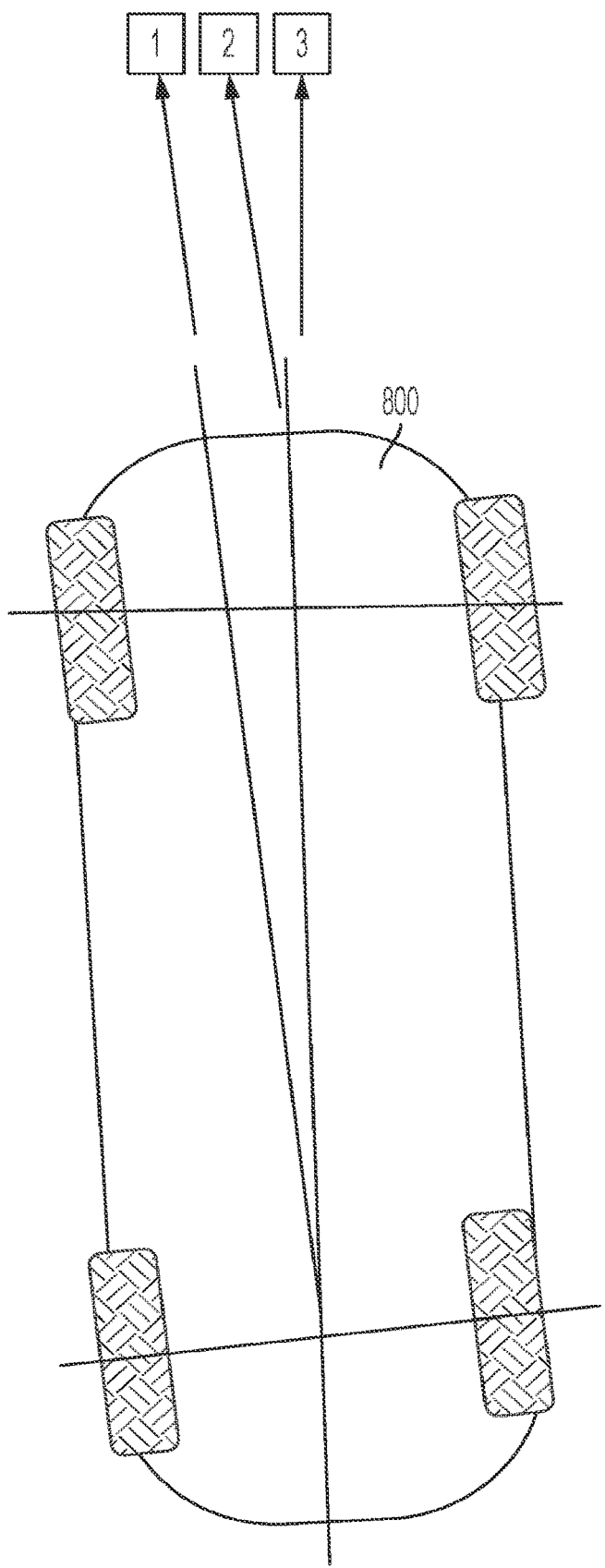
FIG. 8C illustrates relevant alignment parameters for positioning an ADAS calibration element.

This solution is somewhat compromised, but the error will be small, since the angle between the drive direction of vehicle 800 and its geometric centerline should be small. This is illustrated in FIG. 8C, showing ADAS calibration element 861 at ideal position 1 on the thrust line, which is assumed to be the same as the vehicle's drive direction; and at position 2 using laser 896 set parallel to the drive direction oriented to the front of the vehicle 800. It can be seen that position 2 is slightly compromised but reduces the error that would result from direct placement on the vehicle centerline position 3. Systems currently available place the ADAS element on the body centerline, so this embodiment is an improvement over prior art techniques.

In addition, since the relative orientation of the cameras 879, 881 is known, the wheel alignment values can be calculated, as described herein above, for the purpose of verification against the manufacturer specifications.

In an alternative embodiment, a target 894 is placed on the centerline of the vehicle in view of either camera 879 or 881. The direction of the vehicle centerline is known based on the wheel alignment measurement. The position of the centerline in the gravity plane is determined by the placed target. The user interface is then used to guide the operator to place the carrier stand on the vehicle centerline or vehicle thrust line based on manufacturer requirements. Alternatively, known structures on the front of the vehicle such as fascia features or emblems could be used by the camera instead of the target 894 to locate a point on the vehicle centerline.

In another embodiment, a mechanical device is used to measure the width of the car from the outer surface of the rear wheels. This width can entered into the user interface, and the center of the vehicle with respect to the wheel targets can be calculated and used to determine the centerline of the vehicle.

In an alternative embodiment, the distance between the cameras 879, 881 on the carrier stand 871 is measured or established mechanically. This would provide enough information to calculate the width of the vehicle and establish the location of the vehicle thrust line.

A tape measure can be used to set the distance between the carrier stand 871 and the vehicle 800, where the required distance is from the vehicle body and the carrier stand.

In the case where the defined distance from the carrier stand 871 to the vehicle 800 is measured from the center of the front wheels, the cameras 879, 881 on the carrier stand 871 can be used to measure the distance between the vehicle 800 and the calibration element 861, and the user interface could guide the operator to set the carrier stand.

In other embodiments, a target 892 is placed on the surface on which the vehicle is sitting, in the field of view of one of the cameras 879, 881, and the relative height of the cameras and the crossbar 877 is then controlled or calibrated. The user interface then guides the operator to raise the crossbar 877 to the correct height to position the calibration element 861.

After the ADAS calibration element 861 is placed in the correct location using one of the above disclosed techniques, a diagnostic device is connected to the OBDII port of the car, and is used to initiate the calibration process, which is performed by the ECU of the car.

Embodiments with a Single Camera Mounted to Fixture

According to a further embodiment of this disclosed technique, a single camera 891 is mounted to the fixture 860, and one or more targets 893 is fixed to the vehicle anywhere in view of the camera 891. The camera 891 is mounted on a known location and orientation to the centerline 890 of the carrier stand 871 by calibration or mechanical design. A display device such as user interface 898 is provided as in previous embodiments. The vehicle 800 is rolled forward, backward, or both. As described herein above, the translation of the targets is measured and the drive direction is established. Since the camera 891 is in a known relationship to the carrier fixture 860, the user interface can guide the user to orient the fixture centerline to the drive direction. The carrier stand 871 is set in distance and centered on the car 800 as described in the previous embodiment.

In a variation of this embodiment, the target (i.e., a target 894) is mounted on the center of the front bumper of the vehicle 800. When the location of the target 894 is measured, the centerline of the vehicle 800 and the distance to the bumper are known. The user interface directs the operator to position the carrier stand 860 in orientation to the drive direction and in relative location to the center of the vehicle 800 and centerline from the front bumper.

In another variation of this embodiment, an additional target is placed on a side of the vehicle directly above the front wheel center in view of the camera 891; for example, target 893 can be a ride height target. Since the camera 891 can measure the distance to this target 893, the distance between the carrier stand 860 and the vehicle 800 with relationship to the wheel center can be controlled, and placement guided by the user interface.

In a further variation of this embodiment, the camera (i.e., a camera 895) is placed on the crossbar 877 in a known or calibrated location relative to the crossbar and the centerline 890 of the fixture 860. A target 892 is placed on the same surface as the vehicle, in the field of view of the camera 895. As described above, the height of target 892 from the floor is determined and the user interface guides the user in setting the height of the crossbar 877.

Those of skill in the art will understand that there are many possible locations for the target and camera depending, for example, on where measurements are needed. The above-described locations are thus exemplary and not exclusive.

Embodiments with a Camera Viewing the Fixture

In a further embodiment, a camera 897 is placed on the vehicle such that it can see the carrier stand 871, and a target is placed on the carrier stand 871. The target can be placed on the carrier stand 871, on the crossbar 877, embedded in the calibration element 861, or in the case of forward camera calibration, the ADAS calibration element 861 is used as a target and can be viewed by the camera 897. Operation and relative locations are determined as in the previous embodiment, with the locations of the camera and target interchanged. If the camera 897 is mounted to the front bumper of the car 800, the distance between the fixture and front bumper can be controlled. If a target is placed on the floor in the view of the camera and the vehicle is on the floor or at a known height from the floor and the target on the carrier stand is on the crossbar, the height of the crossbar and calibration element can be controlled.

In the above-described embodiments, all relative locations of the stand and vehicle can be stored in the measurement system and retrieved to show that the procedure was performed correctly. In the first embodiment, the wheel alignment can also be stored.

In all embodiments, the process of camera images and derivation of relative distance, wheel alignment, and driveline can be performed in the camera, in the display device, or on a remote connected device.

The ADAS calibration elements, targets, or fixtures themselves can be used as targets and the measurement cameras used to locate them, measure the drive direction as previously described herein, and the fixture adjusted appropriately.

Drive-On Aid Using Drive Direction Calculation

The calculated drive direction can be used to guide an operator to drive a vehicle onto a conventional alignment rack or lift such that the vehicle is straight relative to the rack, and its front wheels are centered on the rack's turnplates. This embodiment requires an aligner, two conventional ride height targets (optionally four ride height targets), and targets for the rack's turnplates (or alternatively, turnplates comprising targets). This technique also requires that calibration of the turnplate targets to the center of the turnplate is performed before it is used.

Figure 9:
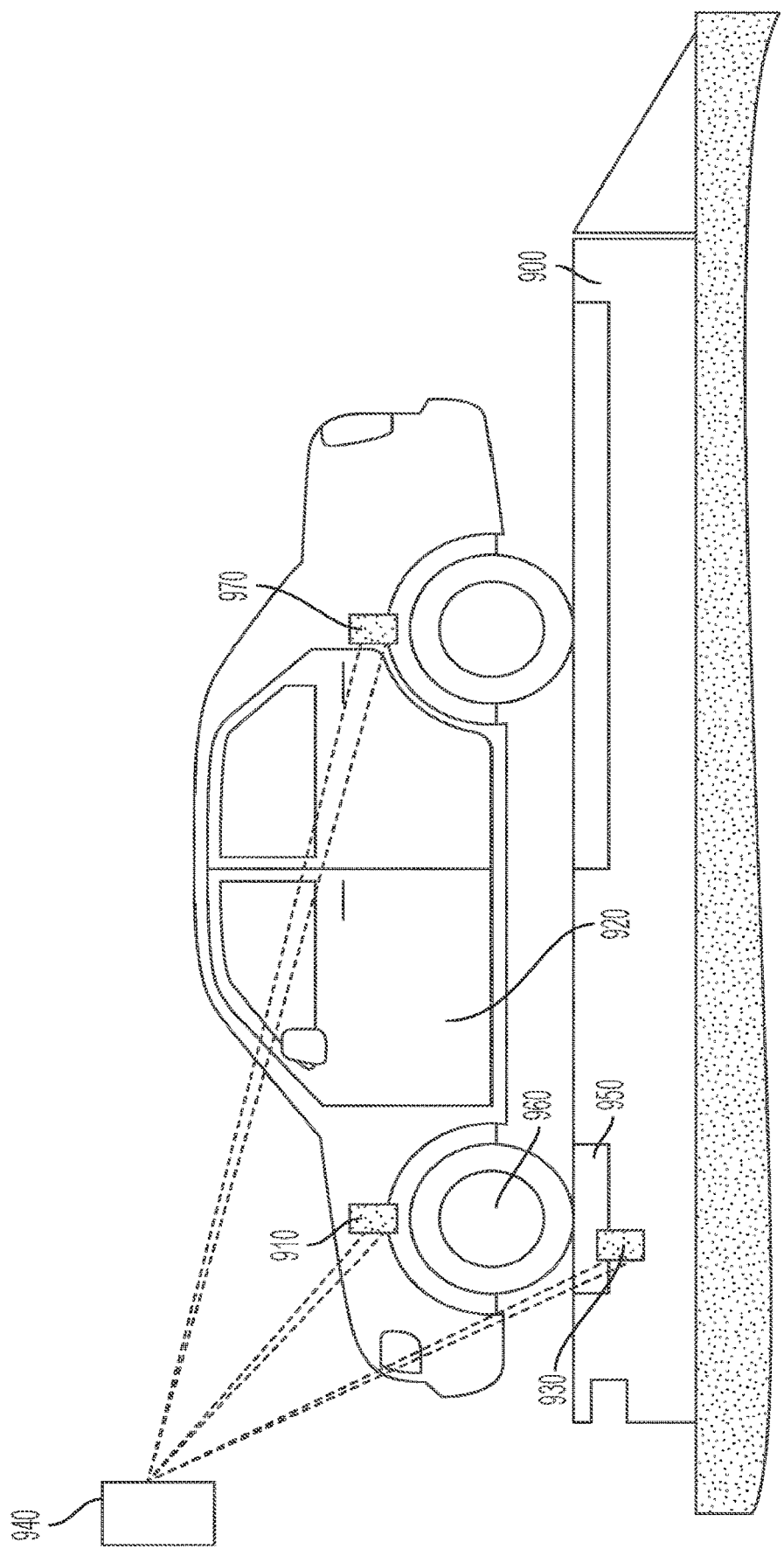
FIG. 9 is a schematic side view of a drive-on aid system according to an embodiment of the present disclosure.

Referring now to FIG. 9, the operator attaches a ride height target 910 at the apex of each front fender wheel of the vehicle 920 well prior to driving the vehicle 920 onto to the rack 900. The aligner ensures that the turnplate targets 930 and ride height targets 910 are visible to its cameras 940, and proceeds to a setup screen on its user interface. The width between the front ride height targets 910 is measured relative to the width between the turnplate targets 930, and the operator is instructed to adjust the distance between the turnplates 950 as necessary to match the track width of the vehicle 920, which is approximately determined from the distance between ride height targets 910. Additionally, the track width could be read from the vehicle specification database if present. Otherwise, the aligner could measure the distance between the turnplates 950 at the end of the drive-on process and save it in the specification database.

The aligner proceeds to a guidance screen of its user interface. The operator then begins to drive the vehicle 920 slowly onto the rack 900. As the vehicle 920 begins to move, the aligner processes the ride height target 910 movement into an instantaneous drive direction per the "Drive Direction Basic Principles" herein above, and calculates the trajectory of the vehicle 920 relative to the location of the turnplates 950. The aligner uses this trajectory to guide the operator so that the vehicle 920 is straight on the rack 900 and comes to rest with the front wheels 960 centered on the turnplates 950.

Optionally, rear ride height targets 970 are also attached and used to provide feedback as to how square the vehicle 920 is with the aligner and rack 900 as the vehicle 920 is driven onto the rack 900.

Embodiments of the disclosed methods and systems for performing vehicle alignments using a drive direction calculation may be readily implemented, fully or partially, in software using, for example, object or object-oriented software development environments that provide portable source code that can be used on a variety of computer platforms. Alternatively, embodiments of the disclosed method and system can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the disclosed method and system can be implemented in hardware and/or software using any known or later developed systems or structures, devices and/or software by those of ordinary skill in the applicable art from the functional description provided herein and with a general basic knowledge of the computer, marine barrier and gate, and/or presence-based automatic gate arts.

Moreover, embodiments of the disclosed methods and systems for performing vehicle alignments using a drive direction calculation can be implemented in software executed on a programmed general-purpose computer, a special purpose computer, a microprocessor, or the like. Also, the method of this disclosure can be implemented as a program embedded on a personal computer such as a JAVA® or CGI script, as a resource residing on a server or graphics workstation, as a routine embedded in a dedicated processing system, or the like.

While this disclosure has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this disclosure.

What is claimed is:

1. A system for aligning a fixture relative to a vehicle, the fixture being separate from the vehicle, the system comprising:
    an image sensor for viewing a target disposed on the vehicle, and for capturing image data of the target as the vehicle is rolled, the image sensor being mounted on the fixture in a known location and orientation relative to a centerline of the fixture; and
    a data processor for performing the steps of:
    calculating, using the image data, a plural number of poses of the target as the vehicle is rolled;
    calculating a drive direction of the vehicle which is a direction in which the vehicle is moving in a coordinate system of the image sensor using the calculated poses of the target; and
    guiding a user to orient the centerline of the fixture to the vehicle drive direction using a user interface.

2. The system of claim 1, wherein the fixture is for carrying an ADAS calibration element.

3. The system of claim 1, comprising a laser mounted on the centerline of the fixture and in view of a centerline of the vehicle, such that the user can visually relate the fixture to a point on the centerline of the vehicle.

4. A system for aligning a fixture relative to a vehicle, the system comprising:
    an image sensor for viewing a target disposed on the vehicle, and for capturing image data of the target as the vehicle is rolled, the image sensor being mounted on the fixture in a known location and orientation relative to a centerline of the fixture; and
    a data processor for performing the steps of:
    calculating, using the image data, a plural number of poses of the target as the vehicle is rolled;
    calculating a drive direction of the vehicle using the calculated poses of the target; and
    guiding a user to orient the centerline of the fixture to the vehicle drive direction using a user interface;
    wherein the target is mounted on the center of a front portion of the vehicle, wherein the data processor is for:
    determining a location of the target using the image sensor;
    calculating a centerline of the vehicle and the distance from the centerline of the fixture to the front portion of the vehicle using the location of the target; and
    guiding the user to position the fixture in orientation to the drive direction, and relative to the center of the front portion of the vehicle and to the vehicle centerline.

5. The system of claim 4, wherein the target is mounted to the center of a front bumper of the vehicle.

6. A system for aligning a fixture relative to a vehicle, the system comprising:
    an image sensor for viewing a target disposed on the vehicle, and for capturing image data of the target as the vehicle is rolled, the image sensor being mounted on the fixture in a known location and orientation relative to a centerline of the fixture; and
    a data processor for performing the steps of:
    calculating, using the image data, a plural number of poses of the target as the vehicle is rolled;
    calculating a drive direction of the vehicle using the calculated poses of the target; and
    guiding a user to orient the centerline of the fixture to the vehicle drive direction using a user interface;
    wherein the system comprises a second target mounted on a side of the vehicle directly above a front wheel center and in view of the image sensor, and
    wherein the data processor is for measuring a distance from the fixture to the second target, and for guiding the user to place the fixture at a predetermined distance from the front wheel center using the user interface.

7. The system of claim 2, wherein the fixture comprises a height-adjustable crossbar for carrying the ADAS calibration element and the image sensor, the image sensor being mounted on the crossbar in a known or calibrated location relative to the crossbar and the centerline of the fixture;
    wherein the system further comprises a second target disposed on a surface on which the vehicle is sitting, in view of the image sensor; and
    wherein the data processor is for determining the height of the crossbar relative to the surface using the second target and the image sensor, and for guiding a user to adjust the height of the crossbar to a predetermined height using the user interface.

8. A system for aligning a fixture relative to a vehicle, the fixture being separate from the vehicle, the system comprising:
    an image sensor disposed on the vehicle for viewing a target, and for capturing image data of the target as the vehicle is rolled, the target being mounted on the fixture in a known location and orientation relative to a centerline of the fixture; and
    a data processor for performing the steps of:
    calculating, using the image data, a plural number of poses of the target as the vehicle is rolled;
    calculating a drive direction of the vehicle which is a direction in which the vehicle is moving in a coordinate system of the image sensor using the calculated poses of the target; and
    guiding a user to orient the centerline of the fixture to the vehicle drive direction using a user interface.

9. The system of claim 8, wherein the fixture is for carrying an ADAS calibration element.

10. The system of claim 8, comprising a laser mounted on the centerline of the fixture and in view of a centerline of the vehicle, such that the user can visually relate the fixture to a point on the centerline of the vehicle.

11. A system for aligning a fixture relative to a vehicle, the system comprising:
    an image sensor disposed on the vehicle for viewing a target, and for capturing image data of the target as the vehicle is rolled, the target being mounted on the fixture in a known location and orientation relative to a centerline of the fixture; and a data processor for performing the steps of:

calculating, using the image data, a plural number of poses of the target as the vehicle is rolled;

calculating a drive direction of the vehicle using the calculated poses of the target; and guiding a user to orient the centerline of the fixture to the vehicle drive direction using a user interface;

wherein the image sensor is mounted on the center of a front portion of the vehicle, wherein the data processor is for:

determining a location of the target using the image sensor;

calculating a centerline of the vehicle and the distance from the centerline of the fixture to the front portion of the vehicle using the location of the target; and guiding the user to position the fixture in orientation to the drive direction, and relative to the center of the front portion of the vehicle and to the vehicle centerline.

12. The system of claim 11, wherein the target is mounted to the center of a front bumper of the vehicle.

* * * * *